(12) United States Patent
Wang

(10) Patent No.: US 12,118,292 B2
(45) Date of Patent: Oct. 15, 2024

(54) METHOD AND DEVICE FOR SORTING CHINESE CHARACTERS, SEARCHING CHINESE CHARACTERS AND CONSTRUCTING DICTIONARY

(71) Applicant: John Zhongqi Wang, Bellevue, WA (US)

(72) Inventor: John Zhongqi Wang, Bellevue, WA (US)

(73) Assignee: John Zhongqi Wang, Bellevue, WA (US)

( * ) Notice: Subject to any disclaimer, the term of this patent is extended or adjusted under 35 U.S.C. 154(b) by 401 days.

(21) Appl. No.: 17/304,849

(22) Filed: Jun. 27, 2021

(65) Prior Publication Data

US 2023/0004707 A1    Jan. 5, 2023

(51) Int. Cl.
| | |
|---|---|
| *G06F 16/00* | (2019.01) |
| *G06F 7/08* | (2006.01) |
| *G06F 16/245* | (2019.01) |
| *G06F 16/31* | (2019.01) |
| *G06F 40/123* | (2020.01) |
| *G06F 40/129* | (2020.01) |
| *G06F 40/177* | (2020.01) |
| *G06F 40/242* | (2020.01) |

(52) U.S. Cl.
CPC .............. *G06F 40/129* (2020.01); *G06F 7/08* (2013.01); *G06F 16/245* (2019.01); *G06F 16/316* (2019.01); *G06F 40/123* (2020.01); *G06F 40/177* (2020.01); *G06F 40/242* (2020.01)

(58) Field of Classification Search
None
See application file for complete search history.

(56) References Cited

FOREIGN PATENT DOCUMENTS

| | | | |
|---|---|---|---|
| CN | 101872249 A | * | 10/2010 |
| CN | 101930289 A | * | 12/2010 |

* cited by examiner

*Primary Examiner* — Tuankhanh D Phan

(57) ABSTRACT

The invention discloses a method and a device for sorting Chinese characters, searching for Chinese characters and constructing a dictionary, and relates to the technical field of computers. A specific implementation of the method includes: obtaining the first basic character-forming component of a Chinese character according to the stroke order as the First Character, and encoding the First Character to obtain the First Character code, where the First Character includes the first character-forming component and the first main stroke component of a Chinese character; obtaining the number of strokes included in each Chinese character, and obtaining the corresponding stroke string of each Chinese character; using the First Character code as the first and highest priority sorting field, the number of strokes as the second sorting field, and the stroke string as the third and the lowest priority sorting field to sort Chinese characters. This embodiment can solve the problem of difficulty in sorting and searching of Chinese characters caused by the unfixed definition and position of radicals.

22 Claims, 21 Drawing Sheets

Figure 2

|   | a | b | c | d | e | f | g | h | i | j | k | l | m | n | o | p | q | r | s | t |
|---|---|---|---|---|---|---|---|---|---|---|---|---|---|---|---|---|---|---|---|---|
| A | 一 | 丨 | 丿 | 丶 | 乙 | 二 | 十 | 丁 | 厂 | 七 | 匕 | 卜 | 八 | 人 | 乂 | 儿 | 入 | 刀 | 几 | 九 |
| B | 乃 | 又 | 了 | 力 | 刁 | 乜 | 三 | 干 | 于 | 工 | 土 | 士 | 下 | 才 | 寸 | 丈 | 兀 | 大 | 万 | 弋 |
| C | 上 | 门 | 口 | 山 | 巾 | 小 | 千 | 川 | 个 | 夕 | 及 | 久 | 广 | 亡 | 丫 | 之 | 尸 | 己 | 己 | 巳 |
| D | 弓 | 子 | 孑 | 孓 | 女 | 歹 | 幺 | 飞 | 也 | 习 | 丸 | 丰 | 王 | 井 | 夫 | 韦 | 专 | 卅 | 廿 | 木 |
| E | 五 | 丐 | 长 | 不 | 犬 | 歹 | 瓦 | 车 | 牙 | 屯 | 戈 | 止 | 日 | 曰 | 中 | 贝 | 见 | 内 | 水 | 牛 |
| F | 手 | 毛 | 气 | 片 | 斤 | 爪 | 父 | 氏 | 心 | 月 | 丹 | 文 | 方 | 火 | 为 | 户 | 尹 | 夬 | 尺 | 丑 |
| G | 巴 | 书 | 矛 | 毋 | 爿 | 未 | 末 | 玉 | 示 | 戋 | 甘 | 世 | 本 | 亘 | 石 | 戊 | 龙 | 东 | 业 | 且 |
| H | 目 | 申 | 甲 | 电 | 田 | 由 | 央 | 史 | 四 | 皿 | 冉 | 厶 | 凹 | 乍 | 乘 | 丘 | 白 | 斥 | 瓜 | 乎 |
| I | 乐 | 必 | 册 | 立 | 永 | 民 | 弗 | 矛 | 皮 | 母 | 耒 | 耳 | 亚 | 覀 | 西 | 而 | 页 | 曳 | 虫 | 曲 |
| J | 肉 | 缶 | 年 | 竹 | 自 | 臼 | 舟 | 兆 | 衣 | 羊 | 米 | 州 | 聿 | 艮 | 臣 | 覀 | 酉 | 豕 | 甫 | 两 |
| K | 求 | 豕 | 里 | 串 | 我 | 身 | 豖 | 豆 | 華 | 雨 | 果 | 非 | 垂 | 氽 | 臾 | 金 | 承 | 革 | 柬 | 舄 |
| L | 盡 | 禹 | 食 | 麂 | 龍 | 黑 | 象 | 鼻 |   |   |   |   |   |   |   |   |   |   |   |   |

Figure 3

| Stroke | Alphabet code | Stroke | Alphabet code | Stroke | Alphabet code |
|---|---|---|---|---|---|
| — | a | L | E | L | P |
| ╱ | b | L | F | L | Q |
| ┃ | c | ∠( ) | G | L( , ) | R |
| ╛ | d | < | H | L | S |
| ╯ | e | ╱ | I | L | T |
| ` | f | ) | J | ζ | U |
| ╲ | g | \ | K | L(∠) | V |
| ７( ) | A | L | L | ζ | W |
| ７( ) | B | L | M | ζ( ) | X |
| ⇁ | C | L | N | ζ( ) | Y |
| ( , ) | D | )( ) | O | | |

Figure 5

| Chinese Character | Page In Dictionary | First Character Code | Number of Strokes | Stroke Alphabet String |
|---|---|---|---|---|
| 一 | 167 | Aa | 1 | a |
| [丨] | | Ab | 1 | c |
| [丿] | 65 | Ac | 1 | e |
| [丶] | | Ad | 1 | f |
| 二 | 167 | Af | 2 | aa |
| 十 | 170 | Ag | 2 | ac |
| 丁 | 158 | Ah | 2 | ad |
| 厂 | 151 | Ai | 2 | ae |
| 七 | 169 | Aj | 2 | bS |
| 匕 | 83 | Ak | 2 | eS |
| 卜 | 105 | Al | 2 | cf |
| 八 | 172 | Am | 2 | eg |
| 人 | 1 | An | 2 | eg |
| 乂 | 173 | Ao | 2 | eg |
| 入 | 83 | Aq | 2 | eK |
| 刀 | 85 | Ar | 2 | Oa |

Figure 7

| Chinese Character | Page In Dictionary | First Character Code | Number of Strokes | Stroke Alphabet String |
|---|---|---|---|---|
| 狩 | 313 | Hd | 10 | HHbffaaceg |
| 永 | 273 | He | 5 | fO8eg |
| 詠 | 273 | He | 8 | cAafO8eg |
| 泳 | 273 | He | 9 | ffbfO8eg |
| 漾 | 273 | He | 14 | ffbfeaacafO8eg |
| 弗 | 414 | Hf | 5 | AaXec |
| 佛 | 414 | Hf | 7 | ecAaXec |
| 拂 | 414 | Hf | 8 | adbAaXec |
| 沸 | 414 | Hf | 8 | ffbAaXec |
| 狒 | 414 | Hf | 8 | HHbAaXec |
| 費 | 414 | Hf | 9 | AaXeccEef |
| 矛 | 58 | Hg | 5 | Cfcde |
| 茅 | 59 | Hg | 8 | accCfcde |
| 茆 | 59 | Hg | 9 | Cfcdeaceg |
| 矜 | 58 | Hg | 12 | adbCfcdeaceg |
| 鶩 |  | Hg | 12 | CfcdecOcgcAa |
| 皮 | 435 | Hh | 5 | Bce8g |
| 披 | 435 | Hh | 8 | adbBce8g |
| 疲 | 435 | Hh | 8 | eecBce8g |
| 波 | 435 | Hh | 8 | ffbBce8g |
| 簸 | 504 | Hh | 10 | eCAaaBce8g |
| 破 | 361 | Hh | 10 | faeffBce8g |
| 被 | 435 | Hh | 10 | fBcffBce8g |
| 跛 | 126 | Hh | 11 | accffb8ce8g |
| 頗 | 469 | Hh | 11 | Bce8gaecEef |
| 皺 | 436 | Hh | 11 | ffb8ceBgHea |
| 母 | 203 | Hi | 5 | DOfaf |
| 拇 | 204 | Hi | 8 | adbDOfaf |
| 姆 | 205 | Hi | 9 | ecaeDOfaf |
| 海 | 204 | Hi | 9 | fNaeDOfaf |
| 霉 | 204 | Hi | 11 | aacaaeDOfaf |

Figure 8

| | | | | |
|---|---|---|---|---|
| 教 36 | 縱 204 | 絨 30 | 懲 207 | 宜 114 |
| 孝 36 | 絕 426 | | 警 207 | 瑗 97 |
| 翡 432 | 絀 161 | 女 193 | 懋 428 | 瑗 452 |
| 浮 6 | 絮 30 | 幻 194 | | 姑 106 |
| 泙 433 | 挺 113 | 玄 194 | 半 256 | 珍 352 |
| 蠶 87 | 悉 270 | 幼 193 | 悖 378 | 玲 97 |
| 教 433 | 緇 200 | 瑩 193 | 討 197 | 珊 98 |
| 敏 | 牡 424 | 慈 75 | 押 295 | 珠 283 |
| 浮 433 | 絨 36 | 拗 4 | 懺 39 | 瑕 402 |
| 縱 | 縈 372 | 嘯 451 | 逢 379 | 琪 97 |
| 藪 | 緗 197 | 竣 196 | 憲 237 | 瑩 483 |
| 絮 190 | 妝 | 嘉 76 | 慧 5 | 蓮 401 |
| 纏 433 | 綺 497 | 奮 195 | 惜 379 | 蓮 382 |
| 縊 451 | 縷 202 | 奎 195 | 評 443 | 球 303 |
| 瀰 383 | 緙 189 | 纏 196 | 蓬 379 | 瑁 118 |
| | 緲 220 | 奮 195 | 糕 379 | 瑰 97 |
| 女 28 | 緞 356 | 捕 | 蓬 5 | 瑾 97 |
| 奴 372 | 緣 358 | 綺 196 | 蓬 379 | 瑕 |
| 奶 157 | 潔 113 | 摔 196 | 鰭 318 | 琴 407 |
| 妆 244 | 緻 201 | | | 琳 97 |
| 安 113 | 綱 496 | 巳 23 | 王 59 | 琢 304 |
| 妇 407 | 緇 30 | 他 24 | 玉 96 | 緞 456 |
| 奸 56 | 縛 386 | 鹿 24 | 主 90 | 瓶 454 |
| 媽 452 | 緩 357 | 池 24 | 匡 382 | 瑄 382 |
| 好 29 | 縉 127 | 撼 108 | 弄 96 | 瓚 270 |
| 如 29 | 緲 260 | | 丹 452 | 琴 407 |
| 妒 30 | 綿 448 | 習 136 | 改 97 | 瑚 98 |
| 媳 24 | 緣 359 | 羽 136 | 皇 400 | 瑚 374 |
| 妥 356 | 綬 14 | 溯 | 住 90 | 璜 382 |
| 妍 | 緘 217 | 聲 353 | 狂 381 | 璜 452 |
| 妓 64 | 紫 29 | 聞 270 | 汪 382 | 璘 431 |
| 努 372 | 綱 215 | 譁 353 | 珏 | 瑗 97 |
| 妙 29 | 綴 393 | 譜 353 | 玩 285 | 瑾 452 |
| 妖 201 | 緬 222 | 謇 353 | 育 | |
| 妹 29 | 綁 21 | 襲 | 环 82 | 井 117 |
| 姨 41 | 蟋 41 | 謦 297 | 琅 468 | 講 222 |
| 纺 336 | 縱 45 | 翼 366 | 玫 97 | 瑚 117 |
| 妻 358 | 綬 29 | 戴 56 | 挂 90 | 進 377 |
| 妹 257 | 縴 47 | | 珪 90 | |
| 姑 29 | 綿 71 | 丸 207 | 圍 326 | 夫 200 |
| 驾 372 | 緇 327 | 挾 207 | 注 381 | 失 206 |
| 姐 99 | 縫 441 | 势 428 | 注 90 | 夫 466 |
| ##########10########## | | | | |
| 笑 128 | 村 306 | 查 436 | 樅 28 | 棣 466 |

Figure 10

| 1 | 一 | ！ | 丿 | ． | 乙 | 2 | 二 | 十 | 丁 | 厂 | 七 | 匕 | 卜 | 八 | 人 | 乂 | 儿 | 刀 |
|---|---|---|---|---|---|---|---|---|---|---|---|---|---|---|---|---|---|---|
| | 1 | 1 | 1 | 1 | 2 | | 2 | 2 | 2 | 2 | 3 | 3 | 3 | 4 | 4 | 4 | 4 | 4 |

| 几 | 九 | 乃 | 又 | 了 | 力 | 3 | 三 | 干 | 于 | 工 | 土 | 士 | 下 | 才 | 寸 | 丈 | 兀 | 大 |
|---|---|---|---|---|---|---|---|---|---|---|---|---|---|---|---|---|---|---|
| 5 | 5 | 5 | 5 | 5 | 5 | | 5 | 5 | 5 | 6 | 6 | 6 | 6 | 6 | 6 | 6 | 6 | 6 |

| 万 | 弋 | 上 | 门 | 口 | 山 | 巾 | 小 | 千 | 川 | 夕 | 及 | 久 | 亡 | 之 | 尸 | 己 | 已 | 巳 |
|---|---|---|---|---|---|---|---|---|---|---|---|---|---|---|---|---|---|---|
| 7 | 7 | 7 | 7 | 7 | 8 | 8 | 8 | 8 | 8 | 9 | 9 | 9 | 9 | 9 | 9 | 9 | 9 | 9 |

| 弓 | 子 | 女 | 幺 | 也 | 习 | 丸 | 4 | 丰 | 王 | 井 | 夫 | 韦 | 甘 | 木 | 五 | 不 | 歹 | 车 |
|---|---|---|---|---|---|---|---|---|---|---|---|---|---|---|---|---|---|---|
| 9 | 9 | 10 | 10 | 10 | 10 | 10 | | 10 | 10 | 10 | 10 | 11 | 11 | 11 | 11 | 12 | 12 | 12 |

| 牙 | 屯 | 戈 | 止 | 日 | 曰 | 中 | 贝 | 见 | 内 | 水 | 牛 | 手 | 毛 | 气 | 斤 | 父 | 氏 | 心 |
|---|---|---|---|---|---|---|---|---|---|---|---|---|---|---|---|---|---|---|
| 12 | 12 | 12 | 12 | 12 | 13 | 13 | 13 | 13 | 13 | 13 | 14 | 14 | 14 | 14 | 14 | 14 | 14 | 14 |

| 月 | 文 | 火 | 尹 | 夬 | 尺 | 丑 | 巴 | 予 | 爿 | 5 | 未 | 末 | 示 | 戋 | 甘 | 世 | 本 | 巨 |
|---|---|---|---|---|---|---|---|---|---|---|---|---|---|---|---|---|---|---|
| 14 | 14 | 15 | 15 | 15 | 15 | 15 | 15 | 15 | 15 | | 15 | 15 | 15 | 15 | 15 | 15 | 15 | 15 |

| 石 | 戊 | 龙 | 东 | 业 | 且 | 目 | 申 | 甲 | 电 | 田 | 由 | 央 | 史 | 皿 | 四 | 冉 | 乍 | 禾 |
|---|---|---|---|---|---|---|---|---|---|---|---|---|---|---|---|---|---|---|
| 15 | 15 | 16 | 16 | 16 | 16 | 16 | 16 | 16 | 16 | 16 | 16 | 16 | 16 | 16 | 16 | 16 | 16 | 17 |

| 丘 | 白 | 斥 | 瓜 | 必 | 立 | 永 | 弗 | 矛 | 皮 | 母 | 6 | 耒 | 耳 | 亚 | 而 | 虫 | 缶 | 竹 |
|---|---|---|---|---|---|---|---|---|---|---|---|---|---|---|---|---|---|---|
| 17 | 17 | 17 | 17 | 17 | 17 | 17 | 17 | 17 | 17 | 17 | | 17 | 18 | 18 | 18 | 18 | 18 | 18 |

| 自 | 臼 | 舟 | 兆 | 衣 | 羊 | 米 | 聿 | 艮 | 7 | 臣 | 要 | 酉 | 束 | 甫 | 两 | 豕 | 里 | 串 |
|---|---|---|---|---|---|---|---|---|---|---|---|---|---|---|---|---|---|---|
| 18 | 18 | 18 | 18 | 18 | 18 | 18 | 19 | 19 | | 19 | 19 | 19 | 19 | 19 | 19 | 19 | 19 | 19 |

| 我 | 身 | 豸 | 言 | 8 | 雨 | 果 | 非 | 垂 | 革 | 禺 | 重 | 鬼 | 黑 |
|---|---|---|---|---|---|---|---|---|---|---|---|---|---|
| 19 | 19 | 19 | 19 | | 19 | 19 | 19 | 19 | 19 | 20 | 20 | 20 | 20 |

Figure 11

|   | a | b | c | d | e | f | g | h | i | j | k | l | m | n | o | p | q | r | s |
|---|---|---|---|---|---|---|---|---|---|---|---|---|---|---|---|---|---|---|---|
| A | 一 | 丨 | 丿 | 丶 | 乙 | 二 | 十 | 丁 | 厂 | 七 | 匕 | 卜 | 八 | 人 | 乂 | 儿 | 刀 | 几 | 九 |
| B | 乃 | 又 | 了 | 力 | 三 | 干 | 于 | 工 | 土 | 士 | 下 | 才 | 寸 | 丈 | 兀 | 大 | 万 | 弋 | 上 |
| C | 门 | 口 | 山 | 巾 | 小 | 千 | 川 | 夕 | 及 | 久 | 亡 | 之 | 尸 | 己 | 已 | 巳 | 弓 | 子 | 女 |
| D | 么 | 也 | 习 | 丸 | 丰 | 王 | 井 | 夫 | 韦 | 廿 | 木 | 五 | 不 | 歹 | 车 | 牙 | 屯 | 戈 | 止 |
| E | 日 | 曰 | 中 | 贝 | 见 | 内 | 水 | 牛 | 手 | 毛 | 气 | 斤 | 父 | 氏 | 心 | 月 | 文 | 火 | 尹 |
| F | 夬 | 尺 | 丑 | 巴 | 予 | 夰 | 未 | 末 | 示 | 戋 | 甘 | 世 | 本 | 巨 | 石 | 戊 | 龙 | 东 | 业 |
| G | 且 | 目 | 申 | 甲 | 电 | 田 | 由 | 央 | 史 | 皿 | 四 | 冉 | 乍 | 禾 | 丘 | 白 | 斥 | 瓜 | 必 |
| H | 立 | 永 | 弗 | 矛 | 皮 | 母 | 耒 | 耳 | 亚 | 而 | 虫 | 缶 | 竹 | 自 | 臼 | 舟 | 兆 | 衣 | 羊 |
| I | 米 | 聿 | 民 | 臣 | 更 | 酉 | 来 | 甫 | 两 | 豕 | 里 | 串 | 我 | 身 | 豸 | 言 | 雨 | 巢 | 非 |
| J | 番 | 華 | 馬 | 重 | 鬼 | 黑 |   |   |   |   |   |   |   |   |   |   |   |   |   |

Figure 12

METHOD AND DEVICE FOR SORTING CHINESE CHARACTERS, SEARCHING CHINESE CHARACTERS AND CONSTRUCTING DICTIONARY

TECHNICAL FIELD

The present invention relates to the field of computer technology, in particular to a method and device for sorting Chinese characters, searching for Chinese characters and constructing a dictionary.

BACKGROUND TECHNIQUE

The sorting and searching of Chinese characters are divided into two categories: shape sequence method and phonetic sequence method. According to the shape of Chinese characters, the current shape sequence method mainly includes the radical method, the stroke and stroke order method and the number method. The phonetic sequence method is based on the pronunciation of Chinese characters, and now it is mainly the Chinese pinyin method.

Since Xu Shen's "Shuowen Jiezi" established the radical method to sort Chinese characters more than 1,800 years ago, the radical method has been dominant until the appearance of the Chinese pinyin method decades ago. The so-called radical method is to summarize Chinese characters into hundreds of different groups, and each group selects a character or symbol as a representative, which is called a radical. When searching for a character, first determine the character's radical and its position, and then you can find the character in a similar place after the radical. If there are many characters in a group, it can also use the number of strokes and stroke order to assist in the searching of characters in the group. "Shuowen Jiezi" defines 540 groups, "Kangxi Dictionary" defines 214 groups, "Xinhua Dictionary" uses 189 groups, "Etymology" uses 250 groups, and "Chinese Characters Radical List" defines 201 groups. In short, the radicals of "Shuowen Jiezi" are defined in a more detailed and comprehensive way, and there are many classifications and combinations of radicals after that.

Stroke and stroke order are sorted according to the number of strokes and the order of strokes. This method first sorts according to the number of strokes, and then according to the order of the strokes. The numbering method assigns a number to the characters according to the shape of the characters to sort them. Phonetic sequence method is based on the sound of the characters. The Chinese Pinyin method uses Roman letters to represent sounds and sort them.

However, the main disadvantage of the traditional and widely used radical method is that the definition and position of radicals are vague and lack strict regularity. To determine what the radical of a character is, sometimes by position, sometimes by sound, sometimes by shape, sometimes by habit, sometimes by the relationship and meaning of radicals and characters, sometimes by rigid rules, and in many cases people are confused. The radical can be a single-body character, it can be a character siding, or it can be a body structure. Often looking up a few characters will run into a situation that takes a lot of time, or even has to give up in the end. The radical method makes the simple matter of looking up an unknown character in the dictionary into a matter of luck and probability.

There are too many characters with the same number of strokes in the stroke count and the stroke order method, which is inconvenient to find. It is generally used as an auxiliary method for other methods. The number of characters applicable to the numbering method is either limited or too many, which is hard to remember. There are many characters with the same pronunciation in pinyin, and characters with unknown or unfamiliar pronunciation cannot be retrieved.

CONTENT OF THE INVENTION

In view of this, the embodiments of the present invention provide a method and device for sorting Chinese characters, searching for Chinese characters, and constructing a dictionary, which can solve the problems of traditional radical searching method due to the unfixed definition and position of radicals and lack of strict regularity. This invention has broken the tradition of needing to use radicals that are not characters themselves. It is systematic, rigorous, practical, efficient, easy to learn and easy to use.

To achieve the foregoing objective, according to one aspect of the embodiments of the present invention, a method for sorting Chinese characters is provided.

A method for sorting Chinese characters based on the first basic character-forming component includes: obtaining the first basic character-forming component of a Chinese character as the First Character according to the stroke order, and encoding the First Character to obtain the First Character code, the First Character including the first character-forming component of a Chinese character, and the first main stroke component of a Chinese character that does not include any character-forming component; get the number of strokes included in each Chinese character, and obtain the stroke string corresponding to each Chinese character based on the preset stroke alphabet encoding rule; the First Character code is used as the first sorting field, the number of strokes is used as the second sorting field, and the stroke string is used as the third sorting field, wherein the priority of the first sorting field is the highest, and the priority of the third sorting field is the lowest.

Optionally, obtaining the first basic character-forming component of the Chinese character as the First Character according to the stroke order and encoding the First Character to obtain the First Character code includes: encoding the Basic Components of the Chinese character to obtain the Basic Component double-alphabet code; and dividing the Chinese character into Basic Components, and obtain the Chinese character double-alphabet code according to the Basic Component double-alphabet code; obtain the first basic character-forming component of the Chinese character as the First Character according to the stroke order, establish the association relationship between the Basic Component and the First Character, and a first matching table of the double-alphabet code and the First Character code of the Basic Component is generated; the First Character code of the Chinese character is determined according to the double-alphabet code of the Chinese character and the first matching table.

Optionally, encoding the Basic Components of Chinese characters to obtain the Basic Component double-alphabet code includes: obtaining the Basic Components of Chinese characters according to the "GB13000.1 Character Set Chinese Character components Specification for Information Processing"; performing the first sort of the Basic Components according to the number of strokes of the Basic Components; for the Basic Components with the same number of strokes in the first sorted Basic Components, perform the second sort according to the stroke order included in the Basic Components; save the second sorted Basic Components in the table to generate an ordered code table. In order to obtain the Basic Component double-alphabet code, wherein the horizontal rows and the vertical columns of the ordered code table are respectively coded with different types of alphabets.

Optionally, encoding the Basic Components of Chinese characters to obtain the double-alphabet codes of the Basic Components includes: obtaining the Basic Components of Chinese characters according to the "GB13000.1 Character Set Chinese Character Components Specification for Information Processing"; the Basic Components are divided into character-forming components and non-character-forming components, and the first sorting is carried out; according to the number of strokes of the Basic Components, the character-forming components and the non-character components are respectively sorted in a second sorting; the Basic Components with the same number of strokes in the character-forming components and the non-character components are respectively sorted in the third sorting according to the stroke order included in the Basic Components; the third sorted Basic Components are saved in the table to generate an ordered code table to obtain the Basic Component double-alphabet codes, wherein the horizontal rows and vertical columns of the ordered code table are respectively coded with different types of alphabets.

Optionally, splitting the Chinese character into Basic Components and obtaining the Chinese character double-alphabet code according to the Basic Component double-alphabet code includes: splitting the Chinese character into Basic Components according to the "GB13000.1 Character Set Chinese Character Component Specification for Information Processing"; according to the double-alphabet code of the Basic Component, the double-alphabet code of all the Basic Components included in each Chinese character is obtained; for each Chinese character, according to the stroke order as defined in the "GB13000.1 Character Set Chinese Character Stroke Order Specification", the double-alphabet codes of all the Basic Components of the Chinese character are combined into the double-alphabet code of the Chinese character.

Optionally, the First Character includes the character-forming First Character and the main stroke First Character; determining the First Character code of the Chinese character according to the double-alphabet code of the Chinese character and the first matching table includes: acquiring the double-alphabet code of the Basic Components included in the double-alphabet code of the Chinese character; according to the sequence of the double-alphabet code of the Basic Components, in turn examine their corresponding First Character code in the first matching table; for each Basic Component double-alphabet code, if its corresponding First Character code in the first matching table is a character-forming First Character, then make the First Character code as the First Character code of the Chinese character; otherwise, according to the first matching table, obtain the First Character corresponding to the first Basic Component code in the Chinese character double-alphabet code as the First Character of the Chinese character.

Optionally, if the First Character of a Chinese character is "囗", and the Chinese character also includes other character-forming component that is not "囗", then the first character-forming component of the Chinese character that is not "囗" is determined as the First Character of the Chinese character.

Optionally, obtaining the stroke string corresponding to each Chinese character according to the preset stroke alphabet encoding rule includes: defining a corresponding letter for each stroke as the alphabet code of the stroke; for each stroke included in the Chinese character, according to the stroke order, the alphabet codes corresponding to all strokes are spliced to obtain the stroke string corresponding to each Chinese character.

Optionally, acquiring the stroke string corresponding to each Chinese character according to the preset stroke alphabet encoding rule includes: defining a corresponding letter for each stroke as the alphabet encoding of the stroke; for each stroke included in the Basic Component, according to the stroke order, combine the alphabet codes corresponding to all strokes to obtain the stroke string corresponding to each Basic Component; establish the association relationship between the double-alphabet code of the Basic Component and the stroke string of the Basic Component and generate a second matching table; for each Chinese character, according to its double-alphabet code, obtains the double-alphabet code of all of its Basic Components; for each double-alphabet code of the Basic Component, the corresponding Basic Component stroke string is searched from the second matching table; according to the sequence of the Basic Components in the double-alphabet code of the Chinese character, the stroke strings of the Basic Components are spliced to obtain the stroke string of the Chinese character.

Optionally, the Chinese character double-alphabet code, the Basic Component double-alphabet code and the First Character code are double-alphabet codes composed of upper and lower case letters; and, when sorting according to the First Character code, the double-alphabet code is sequentially compared for sorting; when sorting is performed according to the stroke string, the sequence of the stroke string is sequentially compared and sorted.

Optionally, the main stroke components include "一", "丨", "丿", "丶" and "乙"; and, the method further includes: according to the "GB13000.1 Character Set Chinese Characters Folding Pen Specification", the stroke "提" is merged into the First Character "一", the strokes 竖钩 are merged into the First Character "丨", the strokes "捺" are merged into the First Character "丶", and all the strokes of "折" are merged into the First Character "乙".

According to another aspect of the embodiments of the present invention, there is provided a device for sorting Chinese characters.

A Chinese character sorting device based on the first basic character-forming component, including: a First Character processing module, used to obtain the first basic character-forming component of a Chinese character as the First Character according to the stroke order, and encode the First Character to obtain the First Character code , the First Character includes the first character-forming component of the Chinese character, and the first main stroke component of the Chinese character that does not include any character-forming components; the stroke processing module is used to obtain the number of strokes included in the Chinese character, and the stroke string corresponding to each Chinese character is obtained according to the preset stroke alphabet encoding rule; the multi-level sorting module is used to use the First Character code as the first sorting field, and the number of strokes as the second sorting field, the stroke string is used as a third sorting field to sort the Chinese characters, wherein the priority of the first sorting field is the highest, and the priority of the third sorting field is the lowest.

According to another aspect of the embodiments of the present invention, a method for constructing a dictionary is provided.

A method for constructing a dictionary based on the Chinese character sorting method based on the first basic character-forming component described in an embodiment of the present invention includes: obtaining the first basic character-forming component of a Chinese character as the First Character according to the stroke order, and the First Character code is obtained by encoding, and the First Character includes the first character-forming component, and the first main stroke component of the Chinese character that does not include any character-forming component; the number of strokes included in each Chinese character, and the stroke string corresponding to each Chinese character is obtained according to the preset stroke alphabet encoding rule; the First Character code is used as the first sorting field, the number of strokes is used as the second sorting field, and the stroke string as the third sorting field to sort the Chinese characters, where the first sorting field has the highest priority, and the third sorting field has the lowest priority; for each Chinese character after sorting, the storage position of each Chinese character in the main text of the dictionary, and the character searching table is generated according to the sorted Chinese character and the storage position corresponding to each Chinese character; according to the number of strokes and stroke order, the First Characters are sorted to generate a First Character table; a dictionary is constructed from the First Character table, the character searching table, and the dictionary text.

Optionally, the character searching table has a page number, and according to the number of strokes and stroke order, sorting the First Characters to generate the First Character table includes: sort the First Characters according to the number of strokes in ascending order; after the first sorting, sort the First Characters with the same number of strokes in the order of the strokes for the second time; generate the First Character table according to the First Characters after the second sorting and the page number of each First Character in the character searching table.

Optionally, before encoding the First Character to obtain the First Character code, the method further includes: adjusting the obtained First Characters according to the size of the dictionary and the included characters.

Optionally, adjusting the First Characters obtained according to the size of the dictionary and the included characters includes: judging whether to adjust the First Characters obtained according to the size of the dictionary; if so, counting the occurrence probability of the character-forming component; according to the set threshold, the occurrence probability is less than the threshold and the character-forming components that will not cause confusion after deletion are deleted from the acquired First Characters; or, combining basic character-forming components that contain a same character-forming component.

According to another aspect of the embodiments of the present invention, a device for constructing a dictionary is provided.

A device for constructing a dictionary based on the Chinese character sorting method based on the first basic character-forming component described in an embodiment of the present invention includes: a First Character processing module, which obtains the first basic character-forming component of a Chinese character as the First Character according to the stroke order, and the First Character is encoded to obtain the First Character code. The First Character includes the first character-forming component of the Chinese character, and the first main stroke component of the Chinese character that does not include any character-forming components. Stroke processing module, which obtains the number of strokes included in each Chinese character, and obtains the stroke string corresponding to each Chinese character according to preset stroke alphabet encoding rules; multi-level sorting module, using the First Character code as the first sorting field, the number of strokes is used as a second sorting field, and the stroke string is used as a third sorting field to sort the Chinese characters, wherein the priority of the first sorting field is the highest, and the priority of the third sorting field is lowest; the character searching table generation module, used to obtain the storage position of each Chinese character in the dictionary text for each Chinese character after sorting, and according to each Chinese character after sorting and the storage position corresponding to each Chinese character, generate the character searching table; the First Character table generation module is used to sort the First Characters to generate a First Character table according to the number of strokes and stroke order; a dictionary construction module is used to construct a dictionary from the First Character table, the character searching table, and the dictionary text.

According to another aspect of the embodiments of the present invention, there is provided a Chinese character searching method.

A method for searching Chinese characters using a dictionary constructed in an embodiment of the present invention includes: obtaining the first basic character-forming component of the Chinese character to be retrieved as the First Character according to the stroke order; if the Chinese character includes character-forming components, the First Character is the first Character-forming component of the Chinese character; if the Chinese character does not include any character-forming component, the First Character is the first main stroke component of the Chinese character; from the First Character table, the First Character and its corresponding page number in the character searching table is found; the Chinese character is searched from the character searching table page.

Optionally, finding the First Character from the First Character table, and obtaining the character searching table page corresponding to the First Character includes: finding the First Character from the First Character table, and obtaining its page number in the character searching table; obtain the character from the page number in the searching table.

According to another aspect of the embodiments of the present invention, a Chinese character searching device is provided.

A device for searching Chinese characters using a dictionary constructed in an embodiment of the present invention includes: a First Character acquisition module for obtaining the first basic character-forming component of the Chinese character to be retrieved as the First Character according to the stroke order; if the Chinese character includes a character-forming component, the First Character is the first character-forming component of the Chinese character; if the Chinese character does not include any character-forming components, the First Character is the first main stroke component of the Chinese character; First Character table search module, used to find the First Character from the First Character table, and get the character searching table page corresponding to the First Character; character searching table search module, used to find the Chinese character on the page from the character searching table.

According to another aspect of the embodiments of the present invention, an electronic device is provided.

An electronic device, including: one or more processors; a storage device, used to store one or more programs, and when the one or more programs are executed by the one or more processors, the one or multiple processors implement the methods for sorting Chinese characters, searching for Chinese characters, and constructing a dictionary provided by the embodiments of the present invention.

According to still another aspect of the embodiments of the present invention, a computer-readable medium is provided.

A computer-readable medium with a computer program stored thereon, and when the program is executed by a processor, the method for sorting Chinese characters, searching for Chinese characters, and constructing a dictionary provided by an embodiment of the present invention is realized.

An embodiment of the above-mentioned invention has the following advantages or beneficial effects: the first basic character-forming component of a Chinese character is obtained as the First Character by following the stroke order, and the First Character is encoded to obtain the First Character code, and the First Character includes the first character-forming component and the first main stroke component of a Chinese character that does not include any character-forming components; obtain the number of strokes included in each Chinese character, and obtain the stroke string corresponding of the Chinese character according to the preset stroke alphabet encoding rules; the First Character code is used as the first sorting field, the number of strokes is used as the second sorting field, and the stroke string is used as the third sorting field to sort Chinese characters. Among them, the first sorting field has the highest priority, the third sorting field has the lowest priority. This technical solution uses the first basic character-forming component (First Character) as the standard for Chinese character sorting and searching, solves the sorting and searching problem of the traditional radical searching method due to its incorrect definition, non-fixed position of radicals and lack of strict regularity, etc., breaks the tradition of using radicals that are not characters in themselves. This method is systematic, rigorous, practical, efficient, easy to learn and easy to use.

The further effects of the above-mentioned non-conventional alternative manners will be described below in conjunction with specific implementation manners.

DESCRIPTION OF THE DRAWINGS

The drawings are used for a better understanding of the present invention, and do not constitute an improper limitation of the present invention. Among them:

FIG. 2 is a schematic diagram of the double-alphabet code of the Basic Components of Chinese characters according to an embodiment of the present invention;

FIG. 3 is a schematic diagram of a First Character code table according to an embodiment of the present invention;

FIG. 5 is a schematic diagram of a stroke alphabet encoding table according to an embodiment of the present invention;

FIG. 7 is a schematic diagram of the auxiliary sorting table of the character searching table according to an embodiment of the present invention;

FIG. 8 is a schematic diagram of the auxiliary sorting table of the character searching table according to another embodiment of the present invention;

FIG. 10 is a schematic diagram of a page of a character searching table of an embodiment of the present invention;

FIG. 11 is a schematic diagram of the First Character table of an embodiment of the present invention;

FIG. 12 is a schematic diagram of the First Character code of a sample dictionary according to an embodiment of the present invention;

DETAILED IMPLEMENTATIONS

The following describes exemplary embodiments of the present invention with reference to the accompanying drawings, which include various details of the embodiments of the present invention to facilitate understanding, and should be regarded as merely exemplary. Therefore, those of ordinary skill in the art should recognize that various changes and modifications can be made to the embodiments described herein without departing from the scope and spirit of the present invention. Likewise, for clarity and conciseness, descriptions of well-known functions and structures are omitted in the following description.

In order to solve the problems in the prior art, the present invention provides a simple, fast, accurate, unambiguous Chinese character sorting and searching method based on the first basic character-forming component, which can be used in applications such as dictionaries, referred to as the First Character method. The invention solves the problems of vagueness, irregularity, depending on luck of the radical searching method, and inconvenient searching of strokes and stroke order for thousands of years.

Figure 1:
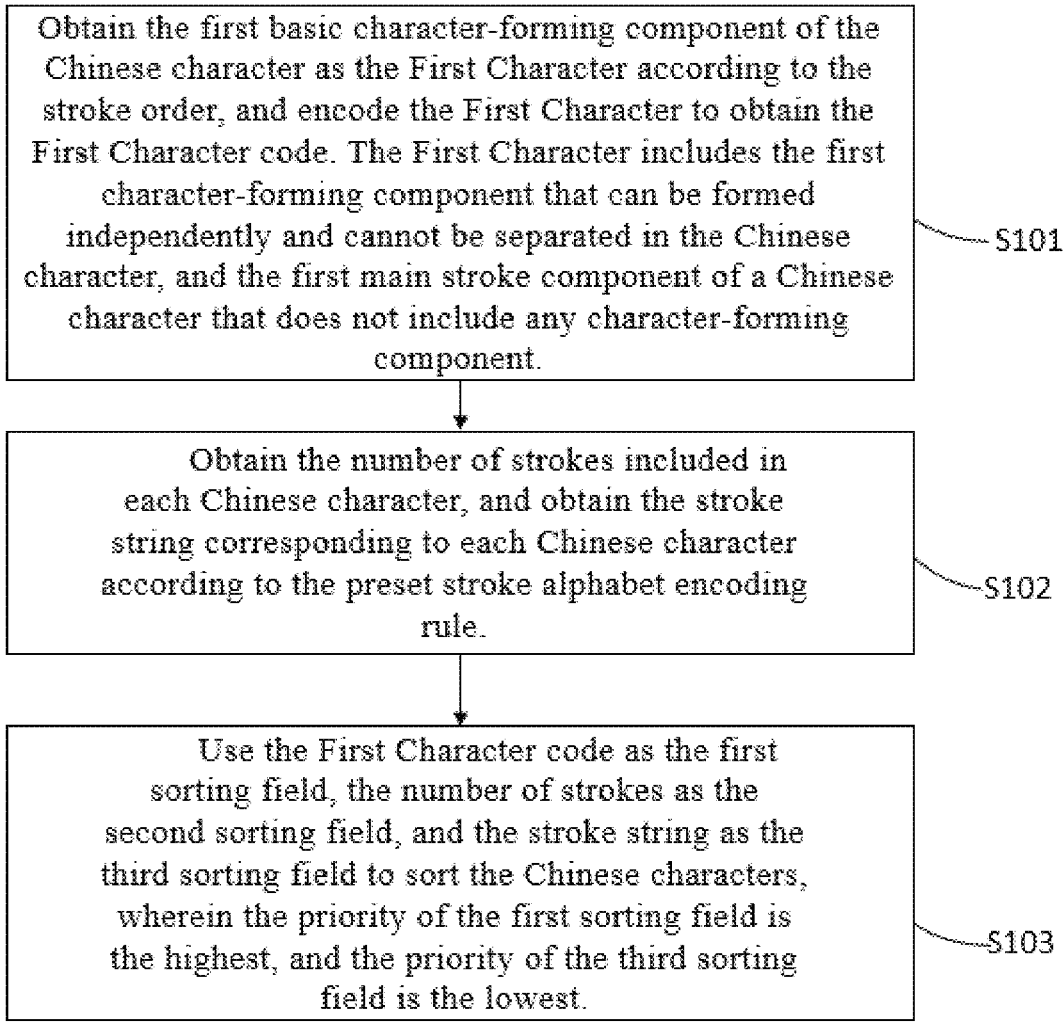
FIG. 1 is a schematic diagram of the main steps of a Chinese character sorting method according to an embodiment of the present invention.

FIG. 1 is a schematic diagram of the main steps of a Chinese character sorting method according to an embodiment of the present invention. As shown in FIG. 1, the Chinese character sorting method of the embodiment of the present invention mainly includes the following steps S101 to S103.

Step S101: Obtain the first basic character-forming component of the Chinese character as the First Character according to the stroke order, and encode the First Character to obtain the First Character code. The First Character includes the first character-forming component of the Chinese character that can be formed independently and cannot be separated, and the first main stroke component of a Chinese character that does not include any character-forming components. In the embodiment of the present invention, the code that appears (E.g. First Character code, Chinese character double-alphabet code, Basic Component double-alphabet code, etc.) is all introduced in letter form as an example. In the specific implementation, the coding form can be flexibly set according to the needs, for example: combination of letters and numbers, combination of letters and special symbols, etc.

On the basis of the research results of modern computer technology, "GB13000.1 Character Set Chinese Character Component Specification for Information Processing" and the attached "Chinese Character Basic Component List" were issued. The issuance of this standard provides a basis for establishing a new set of glyph searching methods. Among them, 560 Basic Components are defined in the "Chinese Character Basic Components Table".

According to the above national standards, the component is a character-forming unit with the function of assembling Chinese characters composed of strokes. Basic Components are the smallest components that are no longer split, and are divided into basic character-forming components (itself is a character, hereinafter referred to as character-forming components) and basic non-character components (itself is not a character, hereinafter referred to as non-character components). Chinese characters can be composed of Basic Components. In other words, the 20,902 Chinese characters in the GB 13000.1 character set, including traditional characters and Japanese and Korean Chinese characters, can be composed of these 560 Basic Components.

Among these 560 Basic Components, there are a total of 225 character-forming components (decided whether it is a character-forming part according to whether a component is included in the 7,000 common characters in the "Modern Chinese Common Character List"). The remaining 335 are non-character components. These 335 non-character components account for about 60% of the total number of components. And except for some individual radicals, most of them are unfamiliar and unnamed physical structures.

On the contrary, the 225 character-forming components are basically the single body characters that are commonly used and familiar to people. In popular reference books such as dictionaries, can these 225 character-forming components be used to search all Chinese characters without the other 335 non-character components?

Through the disassembly and analysis of about 4,000 commonly used Chinese characters, it is found that although non-character components appear frequently in Chinese characters and are widely used as partial structure of the characters, there are very few cases where Chinese characters do not contain any character-forming components.

Therefore, it is entirely possible to use the character-forming component to search the characters. In this way, people can avoid those unfamiliar and unnamed physical symbols when searching for Chinese characters.

Stroke is an auxiliary tool commonly used in Chinese character sorting and searching. Used appropriately can help users.

In order to mark and store each of the above 560 Basic Components in a computer, it should be very convenient if they can be represented by Roman letters in consideration of applications such as keyboard typing. However, a total of 26 letters from A to Z, including only 52 in total with upper and lower cases, which is certainly not enough. With two letters, there are 26×26=676 different combinations, which can meet the needs of 560 components, and there are more 116 spaces for expansion. The utilization rate of double-alphabet resources is quite high, at 83% ($^{560}/_{676}$).

By encoding the Basic Components of Chinese characters, each Basic Component can be determined more conveniently. In the present invention in the embodiment, it is based on the separation of character-forming components and non-character components, the arrangement of the components according to strokes, and the use of double letter code inventive concept of encoding the Basic Components of Chinese characters, specifically, the steps of encoding the Basic Components of Chinese characters to obtain the double-alphabet codes of the Basic Components include: "GB13000.1 Character Set Chinese Character Components Specification for Information Processing" to obtain the Basic Components of Chinese characters; according to whether the Basic Components are character-forming components, the Basic Components are divided into character-forming components and non-character components, and the first sorting is performed; according to the number of strokes of the Basic Components, the second sorting is performed separately among the character-forming components and among the non-character components; after the second sorting, the Basic Components with the same number of strokes are sorted in the third sorting according to the order of the strokes included in the Basic Components; after the third sorting, the Basic Components are saved in the table to generate an ordered code table to obtain the Basic Component double-alphabet code, wherein the horizontal rows and columns of the ordered code table are respectively coded with different types of characters.

Figure 2:
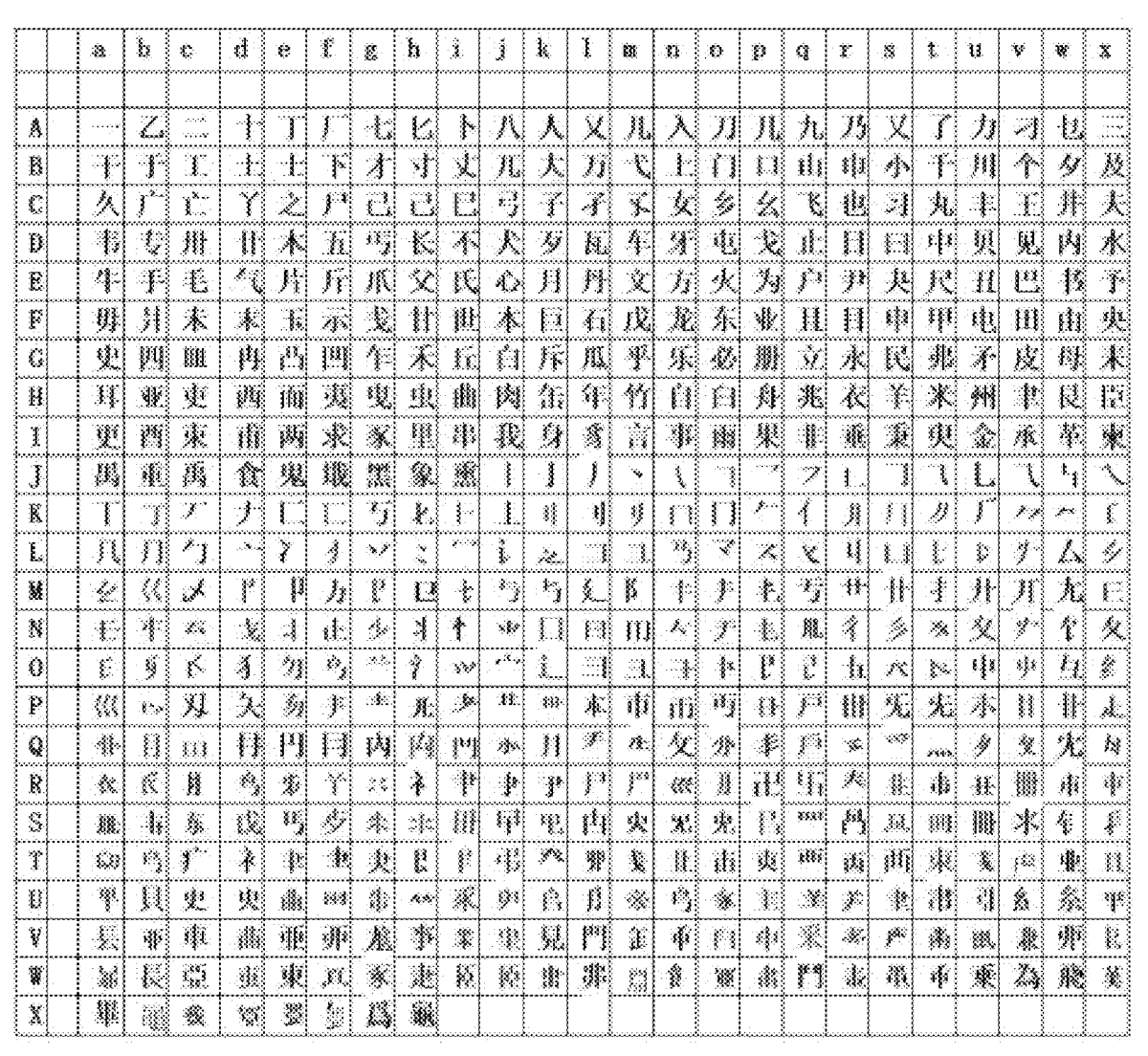

Below in conjunction with the drawings, take the double-alphabet code as an example, introducing the encoding process of the double-alphabet code of the Basic Components of Chinese characters as an embodiment of the present invention. FIG. 2 is schematic diagram of a double-alphabet code table of the Basic Components of Chinese characters according to an embodiment of the present invention. As shown in FIG. 2, in the double-alphabet code table of the Basic Components, according to Chinese characters' strokes and the sequence of strokes, encodes all 560 Basic Components, and each Basic Component is represented by double-alphabets.

In preparation for the Chinese characters Basic Component double-alphabet code table, first the character-forming components of the 560 basis components are arranged in the first half, and the non-character components are arranged in the second half. Then, based on the number of strokes, the components inside of the two groups are arranged from small to large. Then, the components with same number of strokes are arranged in the order of strokes. Finally, all the above Basic Components are filled in a 25×24 grid in order to generate an ordered code table, namely the double-alphabet code table for the Basic Components of Chinese characters in the order of the brush strokes of the Basic Components, among them, the row and column of a Basic Component determine the double-alphabet code of the component. For example, "木" is in row "D" and column "e", and its double alphabet code is "De".

According to another embodiment of the invention, the step of encoding the Basic Components of Chinese characters to obtain the double-alphabet code of the Basic Components can also be: According to the "GB13000.1 Character Set Chinese Character Components Specification for Information Processing" to obtain the Basic Components of Chinese characters; sort the Basic Components according to the number of strokes of the Basic Components; sort again the Basic Components with the same number of strokes in the Basic Components after the first sort, according to the order of the strokes included in the Basic Components; save the second sorted Basic Components in the table to generate an ordered code table to obtain the Basic Component double-alphabet code, wherein the horizontal and vertical rows of the ordered code table are respectively coded with different types of alphabets. When constructing a double-alphabet code table for Basic Components, you can also do not separate the character-forming components from the non-character components, but mix them together and unify coding in order.

Based on Chinese character Basic Component double-alphabet code, the Chinese characters can be coded according to the specifications, and the Chinese character double-alphabet code can be obtained. In the embodiment of the present invention, splitting Chinese characters into Basic Components and obtaining the double-alphabet codes of Chinese characters according to the double-alphabet codes of the Basic Components may specifically include the following steps: according to "GB13000.1 Character Set Chinese Character Components Specification for Information Processing" splits Chinese characters into Basic Components; according to the double-alphabet code of the Basic Components, obtain the double-alphabet code of the Basic Components included in each Chinese character; for each Chinese character, according to "GB13000.1 Character Set Chinese Character Stroke Order Specification", according to the stroke order of the Basic Components included in the Chinese characters, the double-alphabet codes of the Basic Components included in the Chinese characters are combined to obtain the double-alphabet codes of the Chinese characters.

In specific implementation, first, according to the "GB13000.1 Character Set Chinese Character Component Specification for Information Processing", Chinese characters are divided into Basic Components. Due to the regulations, the Basic Components shall not be disassembled anymore, and they can be dismantled when they are separated and connected from each other, and they are not dismantled when they are crossed from each other. Therefore, the steps for dismantling are relatively simple and clear. For example, "明" is divided into "日" and "月". "非" is divided into "丰" and "—". When encountering individual characters that have two or more splitting methods, the number of components should be as few as possible when splitting, first split apart, then split and connect, and then, the first component should have as many strokes as possible.

After splitting the characters into Basic Components, the corresponding Basic Component double-alphabet code can be found in the Chinese character Basic Component double-alphabet code table. According to the "GB13000.1 Character Set Chinese Character Stroke Order Specification", according to the stroke order of each Basic Component of the character, the double-alphabet codes corresponding to these Basic Components are combined to obtain the double-alphabet code of the character.

The following is an example based on the double-alphabet code table of the Basic Components of Chinese characters shown in FIG. 2.

"木" contains only one Basic Component "木" (component double-alphabet code "De"), therefore the encoding (the double-alphabet code) of the character "木" is "De".

"样" is divided into two components "木" (double-alphabet code is "De") and "𦍌" (the double-alphabet code is "Hs"). According to the stroke order of the two Basic Components, the code of "样" is "DeHs".

"品" is divided into three "口" (double-alphabet code is "Bp"), so the code of "品" is "BpBpBp".

"汉" is disassembled into "氵" (the double-alphabet code is "Oh") and "又" (double-alphabet code is "As"), so the code of "汉" is "OhAs".

"顺" is disassembled into "川" (the double-alphabet code is "Bu"), "丿" (the double-alphabet code is "Kc") and "贝" (the double-alphabet code is "Du"), so the code of "顺" is "BuKcDu".

According to the above coding method, by coding all 20902 Chinese characters, traditional characters and Japanese and Korean Chinese characters in the GB13000.1 character set, a complete double-alphabet code of Chinese characters can be obtained. The code length of each character varies from two alphabets of a single Basic Component to multiple alphabets.

Chinese character double-alphabet code according to the embodiment of the present invention includes all the Basic Components of Chinese characters, so it is complete, holographic, single and bidirectional. The code of each character is unique, there is no repeated code, the code can be deduced from the character, and the character can be deduced from the code. The Chinese character encoding in the embodiment of the present invention can be used in such occasions as sorting and searching of Chinese characters.

The Chinese character double-alphabet code table of an embodiment of the present invention is as shown in the Table 1. As shown, only a few Chinese characters and corresponding Chinese character double-alphabet codes are exemplarily listed.

TABLE 1

| Chinese character | Chinese character double-alphabet code |
|---|---|
| 木 | De |
| 样 | DeHs |
| 品 | BpBpBp |
| 典 | UeAj |
| 汉 | OhAs |
| 字 | OjCk |
| 笔 | UhEc |
| 顺 | BuKcDu |
| 码 | KcBpLnAa |

Most Chinese characters contain at least one character-forming component, but about half of the Chinese characters do not start with a character-forming component. Are people willing to look for character-forming components that are not arranged at the beginning of a character when searching for a character? Through multi-person testing, it is found that people are too familiar with these character-forming components, and they like to use them to search characters, and they don't care whether they are at the beginning of a character. Therefore, this leads to an important concept of the present invention, the first basic character-forming component, abbreviated as First Character. For Chinese characters that contain character-forming components, the First Character of a Chinese character is the first character-forming component encountered in a Chinese character in the order of strokes, which is called the character-forming First Character. For example, the "木" in "杄", and the "｜" in "氵｜" ("氵" is not a character-forming component, so skip it).

However, not all Chinese characters include character-forming components. For those Chinese characters that do not contain any character-forming components, as a supplement, the present invention selects the first stroke of a character and merges it into five main stroke components "⼀", "｜", "丿", "丶" and "乙" as the First Character. However, since the main stroke components "⼀" and "乙" have been included in the character-forming components, therefore, in the embodiment of the present invention, "乙" is used as both a character-forming component and a main stroke component; "⼀" is only used as the main stroke component. Among them, according to the "GB13000.1 Character Set Chinese Characters Folding Pen Specification", the stroke "扌" is merged into "⼀", the stroke "竖钩" is merged into "｜", the stroke "捺" is merged into "丶", all "折" strokes are all merged into "乙". In this way, all characters that do not contain character-forming components will also contain a First Character according to the first stroke of the character, which is called the main stroke First Character. The character-forming First Character and the main stroke First Character constitute the invention First Character. Those skilled in the art should understand that the distinction between the character-forming First Character and the main stroke First Character is not unique in the present invention. "⼀" and "乙" can be used as the character-forming First Character or the main stroke First Character. It can be flexibly set according to the requirements of the application scenario.

After the First Character of the Chinese character is obtained, the present invention compiles a double-alphabet code for the First Character, and names it as the first basic character-forming component double-alphabet code, abbreviated as the First Character code. Correspondingly, the First Character includes the character-forming First Character and the main stroke First Character. FIG. 3 is a schematic diagram of a First Character code table according to an embodiment of the present invention. As shown in FIG. 3, it shows that in the embodiment of the present invention, a double-alphabet code composed of uppercase and lowercase letters is used to encode the obtained 228 First Characters, and the obtained First Character code is coded. Because of non-character components "𠂉" is very similar to the character component "月" in shape, and is often used interchangeably, therefore, when used for this purpose, it is treated the same as the "月". Similarly, the non-character component "囗" (frame) and "口" is treated the same.

When encoding the First Character code, the specifics are as follows: First, arrange all the First Characters according to the number of strokes, and then arrange them according to the order of strokes; then, fill them in a new table in order. The rows of the table are coded with lowercase letters, and lowercase letters start from "a" and do not exceed "y". Columns are coded with uppercase letters, and uppercase letters start from "A" and do not exceed "Y". In FIG. 3, taking the First Character "⼀" as an example, the First Character code is "Aa".

However, in the specific implementation, in the process for thousands of Chinese characters, when the First Character code of each character is to be determined one by one, apparently from the above-mentioned First Character code, the efficiency of querying one by one in the table is low. In order to use a computer program to efficiently determine the First Character and the First Character code of a Chinese character, in an embodiment of the present invention, step S101 obtains the first basic character-forming component of a Chinese character as the First Character according to the stroke order, and encode the First Character to obtain the First Character code, which can specifically include following steps: Encode the Basic Components of Chinese characters to obtain the Basic Component double-alphabet code; split the Chinese characters into Basic Components, and obtain the Chinese character double-alphabet code according to the Basic Component double-alphabet code; obtain the first basic character-forming component of the Chinese character as the First Character according to the stroke order; establish the association relationship between the Basic Component and the First Character, and generate the first matching table of the Basic Component double-alphabet code and the First Character code; determine the First Character code of the Chinese character according to the Chinese character double-alphabet code and the first matching table.

Figure 4:
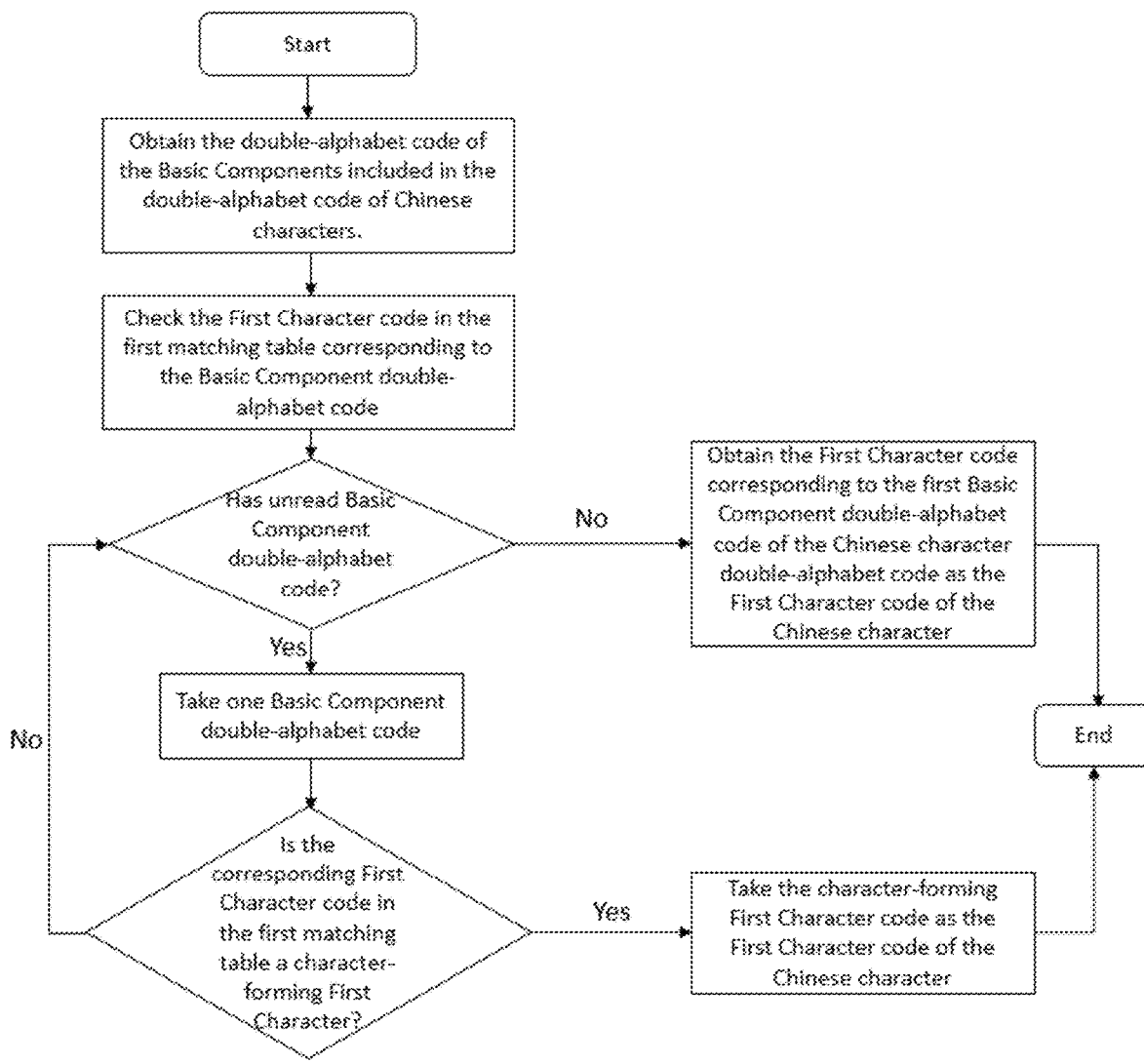
FIG. 4 is a schematic diagram of the realization process of determining the First Character code of Chinese characters according to an embodiment of the present invention.

The previous embodiment introduction has introduced how to obtain the Basic Component double-alphabet code and Chinese character double-alphabet code, the following will combine the Table 2 and FIG. 4 to introduce the construction of the first matching table, and based on the Chinese character double-alphabet code and the first matching table to determine the First Character code of the Chinese character. As shown in the Table 2 below, first and second column show what's included in an embodiment of the present invention first match table.

TABLE 2

| Basis component double-alphabet code | First Character code | Basis component stroke string |
|---|---|---|
| Aa | Aa | a |
| Ab | Ae | V |
| ... | ... | ... |
| Aj | Am | eg |
| Bp | Cc | cAa |
| Bu | Ch | ecc |
| ... | ... | ... |
| Hs | Jj | feaaac |
| Kc | Aa | ae |
| Lg | Ad | fe |
| Ln | Ae | AX |
| Oh | Ad | ffb |

TABLE 2-continued

| Basis component double-alphabet code | First Character code | Basis component stroke string |
|---|---|---|
| Oj | Ad | ffC |
| Ue | Ab | cAacca |
| Uh | Ac | eafeaf |
| ... | ... | ... |
| Xh | Ao | ecAaaScAaaAaaAgea |

When constructing the first matching table, use both the FIG. 2 of double-alphabet code table of the Basic Components and FIG. 3 of the First Character code table. For each Basic Component in FIG. 2, if the Basic Component is a character-forming component, it directly corresponds to a character-forming First Character in FIG. 3. E.g: for Basic Component "八" in FIG. 2, the corresponding double-alphabet code of the Basic Component is "Aj", because it is a character-forming component, the corresponding First Character code can be found as "Am" in the FIG. 3, thus the association relationship between the double-alphabet code and the First Character code of the Basic Component can be established. In another case, if the Basic Component is a non-character component, then obtain the main stroke component corresponding to the first stroke of the non-character component, and use the main stroke component as the First Character corresponding to the Basic Component, for example: the Basic Component "氵" in FIG. 2, the corresponding double-alphabet code of the Basic Component is "Oh", because it is a non-character component, it is necessary to obtain the main stroke components "丶" corresponding to the first stroke "丶" of the non-character component, and set up the relationship between the First Character "Ad" of the main stroke component and the double-alphabet code of the Basic Component. From this, the association relationship between the Basic Component and the First Character is established, and a first matching table of the double-alphabet code and the First Character code of the Basic Component is generated.

FIG. 4 is a schematic diagram of the implementation process of determining the First Character code of a Chinese character according to an embodiment of the present invention. As shown in FIG. 4, in one embodiment of the present invention, for each Chinese character, determining the First Character code of the Chinese character according to the double-alphabet code of the Chinese character and the first matching table mainly can include following steps: obtain the double-alphabet code of the Basic Components included in the double-alphabet code of Chinese character; according to the Basic Component double-alphabet code order, check the First Character code in the first matching table corresponding to the Basic Component double-alphabet code; for each Basic Component double-alphabet code, if the corresponding First Character in the first matching table is a character-forming First Character, then the character-forming First Character is the First Character of the Chinese character; otherwise, according to the first matching table, the First Character code corresponding to the first Basic Component double-alphabet code included in the Chinese character double-alphabet code is obtained as the First Character code of the Chinese character. Specifically, according to the sequence of the double-alphabet codes of the Basic Components included in the Chinese character double-alphabet codes, you can take out a Basic Component double-alphabet code each time and check the corresponding First Character in the first matching table; if it is a character-forming First Character code, then the character-forming First Character code is the First Character code of the Chinese character; otherwise, it indicates that the Chinese character does not have, at this time, a character-forming First Character code, therefore the First Character corresponding to the first Basic Component double-alphabet code of the Chinese character can be obtained and used as the First Character code of the Chinese character.

According to one of the embodiments of the present invention, if the first character-forming component of a Chinese character is "凵", and the Chinese character also includes a character-forming component that is not "囗", then the first character-forming component of the Chinese character that is not "囗" is determined as the First Character of the Chinese character. This is due to the fact that the First Character "囗" participates in the combination of more characters, and it is not balanced with the other characters that participate in the combination. Therefore, reducing the chance of a character containing the First Character "囗" is beneficial to the uniform distribution of the characters in each First Character, and is conducive to quick sorting and searching.

According to the above-mentioned step S101, the first basic character-forming component of the Chinese character can be obtained as the First Character according to the order of strokes, and the code of the First Character can be obtained by encoding.

Step S102: Obtain the number of strokes included in each Chinese character, and obtain the stroke string corresponding to each Chinese character according to a preset stroke alphabet encoding rule. Specifically, when obtaining the stroke string corresponding to each Chinese character according to the preset stroke alphabet encoding rule, in an embodiment of the present invention, a corresponding letter is defined for each stroke as the alphabet code of the stroke; for the strokes included in each Chinese character, the alphabet codes corresponding to all the strokes are spliced according to the stroke order to obtain the stroke string corresponding to each Chinese character. FIG. 5 is a schematic diagram of a stroke alphabet encoding table according to an embodiment of the present invention. As FIG. 5, according to the "GB3000.1 Character Set Chinese Character Folding Pen Specification", the characters belonging to the same First Character are sorted according to the number of strokes and the order of strokes. In order to facilitate the comparison between strokes, each stroke defines a corresponding letter as an alphabet code. If the letter is higher, the strokes are sorted higher. Take "十" as an example, it has two strokes "一" and "丨". According to the FIG. 5, the alphabet code corresponding to "一" is the letter "a", and the alphabet code corresponding to "丨" is the letter "c", so the stroke string of "十" is "ac".

In another embodiment of the present invention, the stroke string corresponding to each Chinese character is obtained according to a preset stroke alphabet encoding rule. Specifics include steps: Define a corresponding letter for each stroke as the alphabet code of the stroke; for the strokes included in each Basic Component, join the alphabet codes corresponding to all the strokes according to the stroke order to obtain the stroke string corresponding to each Basic Component; establish the Basic Component relationship between the double-alphabet code and the Basic Component stroke string and the second matching table is generated; for each Chinese character, the Basic Component double-alphabet code included in the Chinese character double-alphabet code is obtained according to the double-alphabet code of the Chinese character; for each Basic Component double-alphabet code, find the corresponding Basic Component stroke string from the second matching table; according to the sequence of the Basic Component double-alphabet code in the Chinese character double-alphabet code, concatenate the Basic Component stroke string corresponding to each Basic Component double-alphabet code to create the stroke string corresponding to the Chinese character.

In this embodiment, the Chinese characters are split into Basic Components, and the stroke string corresponding to the Basic Component is generated in advance according to the stroke alphabet encoding rule, the stroke string corresponding to the Chinese character can be obtained by splicing the stroke string corresponding to the Basic Component. The stroke string of Chinese characters can be obtained more quickly and conveniently. In the embodiment of the present invention, the number of strokes included in a Chinese character is the number of alphabets included in the stroke string of the Chinese character.

In this example, the process of the generating stroke string corresponding to the Basic Component is similar to the process of generating the stroke string of the Chinese character in the foregoing embodiment, and will not be repeated here. The following will use the Table 2 and FIG. 6 to introduce the building of the second match table, and based on Basic Component stroke string, determine the stroke string of the Chinese character. In the introduction of the embodiments of the present invention, the first matching table and the second matching table are integrated into the aforementioned Table 2 in the show. The first column and the third column of Table 2 show the content of second match table in another embodiment of the invention.

When constructing the second matching table, it is necessary to use both FIG. 2 and FIG. 5 to build. According to the strokes and stroke order of the Basic Components, as well as FIG. 5, you can get the Basic Component stroke string. For example: the Basic Component "八" in FIG. 2, its corresponding double-alphabet code of the Basic Component is "Aj", according to its strokes and stroke order, you can see from the FIG. 5, its stroke string is "eg", in this way, you can create the relationship between a double-alphabet code of the Basic Component and the Basic Component stroke string.

Figure 6:
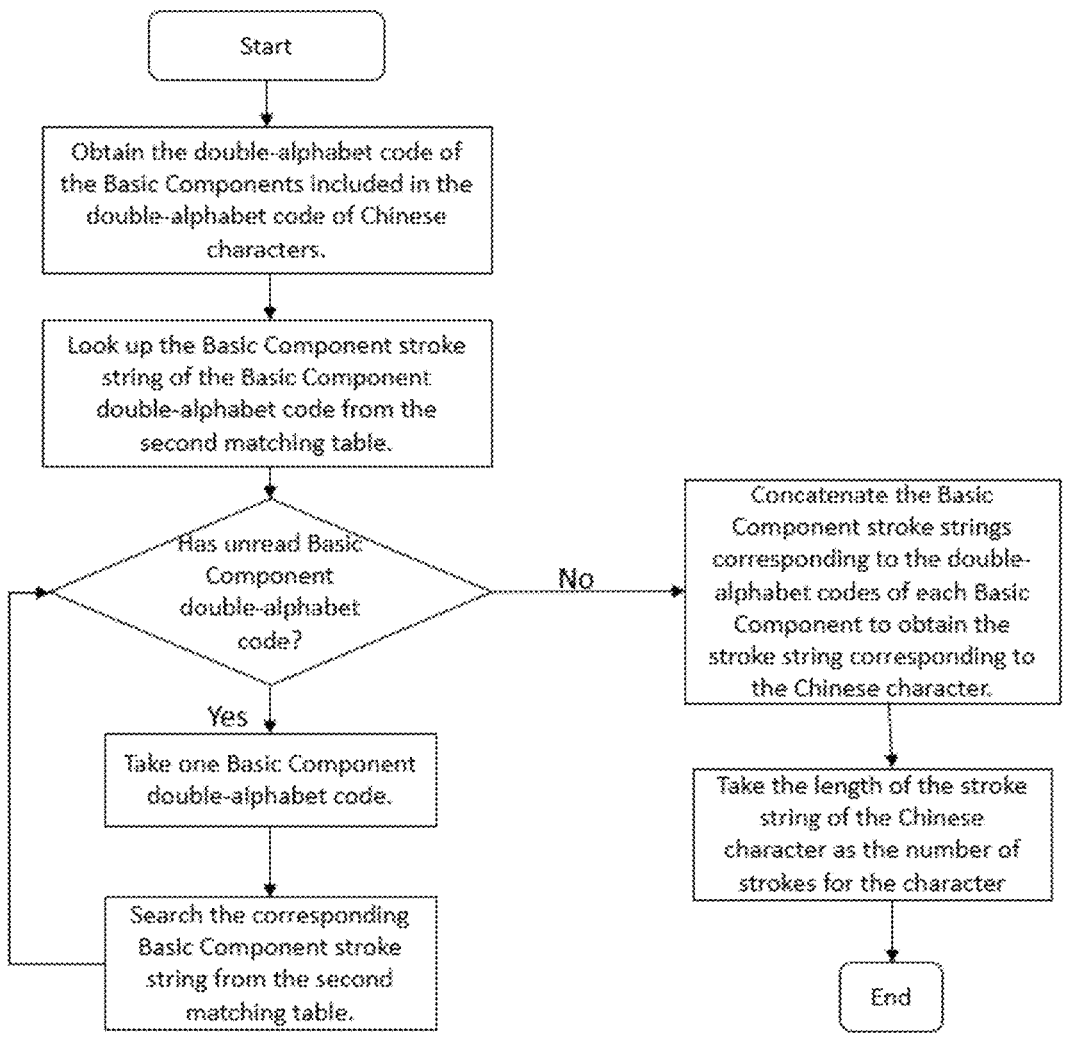
FIG. 6 is a schematic diagram of the realization process of obtaining the stroke string corresponding to the Chinese character according to another embodiment of the present invention.

FIG. 6 is a schematic diagram of the implementation process of obtaining stroke strings corresponding to Chinese characters according to another embodiment of the present invention. As shown in FIG. 6, which shows the realization process of obtaining the stroke string corresponding to the Chinese character, for each Chinese character, first obtain the double-alphabet codes of the Basic Components included in the double-alphabet codes of the Chinese character, and then look up the Basic Component stroke string of the Basic Component double-alphabet code from the second matching table. Specifically, one Basic Component double-alphabet code can be taken out at a time, and the corresponding Basic Component stroke string can be searched from the second matching table. Until all the Basic Component stroke strings corresponding to the double-alphabet codes of the Basic Components are found, according to the order of the Basic Component double-alphabet codes in the Chinese character double-alphabet codes, concatenate the Basic Component stroke strings corresponding to the double-alphabet codes of each Basic Component to obtain the stroke string corresponding to the Chinese character, and the length of the stroke string corresponding to the Chinese character is counted as the number of strokes for the Chinese character.

Step S103: Use the First Character code as the first sorting field, the number of strokes as the second sorting field, and the stroke string as the third sorting field to sort Chinese characters. Among them, the first sorting field has the highest priority and the third sorting field has the lowest priority.

Among them, when sorting according to the First Character code, the double-alphabet code character sequence is compared and sorted in sequence; when the stroke string is sorted, the stroke string is compared and sorted in sequence.

When sorting Chinese characters, first create a Chinese character sorting table, such as the Table 3. As shown, the first column in the table is the sorted characters, the second column is the First Character code of the character, the third column is the stroke number of the character, and the fourth column is the stroke string of the character. Then, insert all the First Characters into the Table 3. Specifically, the First Character code corresponding to the First Character is the highest priority sorting field, the number of strokes is the second priority sorting field, and the stroke string is the lowest priority sorting field, then after sorting insert all the First Characters into the Table 3; Finally, for any First Character to be sorted, according to its First Character code, number of strokes and character string, compare the character with the existing ones in Table 3 one by one to determine the insertion position. Insert all fields to be sorted into the Table 3. After that, the sorting result can be obtained.

TABLE 3

| character | First Character code | Number of strokes | Stroke string |
|---|---|---|---|
| ー | Aa | 1 | a |
| ｜ | Ab | 1 | c |
| 丶 | Ad | 1 | f |
|  | Af | 2 | aa |
| 十 | Ag | 2 | ac |
| 丁 | Ah | 2 | ad |
|  | Ai | 2 | ae |

FIG. 7 is a schematic diagram of the auxiliary sorting table of the character searching table according to an embodiment of the present invention. In the embodiment of the present invention, the introduction is made by taking the sorting of Chinese characters and adding them to the dictionary as an example. FIG. 7 shows a schematic diagram of a page after sorting the First Characters and inserting it into the auxiliary sorting table of the character searching table. At this stage, each line has a First Character, and there is a blank line between the First Characters. The first column of each row is the First Character or the Chinese character to be added to the dictionary later, the second column is the page number of the character in the dictionary body, the third column is the First Character contained in the character, and the fourth column is the number of strokes of the character, the fifth column is the complete stroke string represented by alphabetic symbols for the character.

The order of a character in the table is determined by the contents of the last three columns in each row. Compare the third column first, then the fourth column, and finally the fifth column. For the third column, when sorting according to the First Character code, sort according to the alphabet order of the double-alphabet code; for the fourth column, sort according to the number from small to large; for the fifth column, sort according to the stroke string. When sorting, compare and sort according to the character order of the stroke string, where the lowercase letters of the alphabet are sorted before the uppercase letters. According to this rule, as long as a character defines its own three parameters, it knows where it should be added to the auxiliary sorting table of an existing character searching table.

FIG. 8 is a schematic diagram of the auxiliary sorting table of the character searching table according to another embodiment of the present invention. FIG. 8 shows a schematic diagram of a page after the Chinese characters to be sorted are sorted and inserted into the auxiliary sorting table of the character searching table. For any Chinese character, it can be inserted into the auxiliary sorting table of the character searching table according to the aforementioned sorting method.

According to the above steps S101 to S103, the first basic character-forming component (First Character) can be used as the standard for sorting Chinese characters, which solves the problem of the traditional radical checking method which lacks strictness, which definition and position of radicals are not fixed and which is difficulty to sort and search due to irregularity, breaks the tradition of using radicals that are not characters in themselves, and is systematic, rigorous, practical, efficient, easy to learn and easy to use.

According to another aspect of the present invention, a method of constructing a dictionary is provided. The dictionary in the present invention can be an electronic dictionary or a commonly used entity dictionary.

Figure 9:
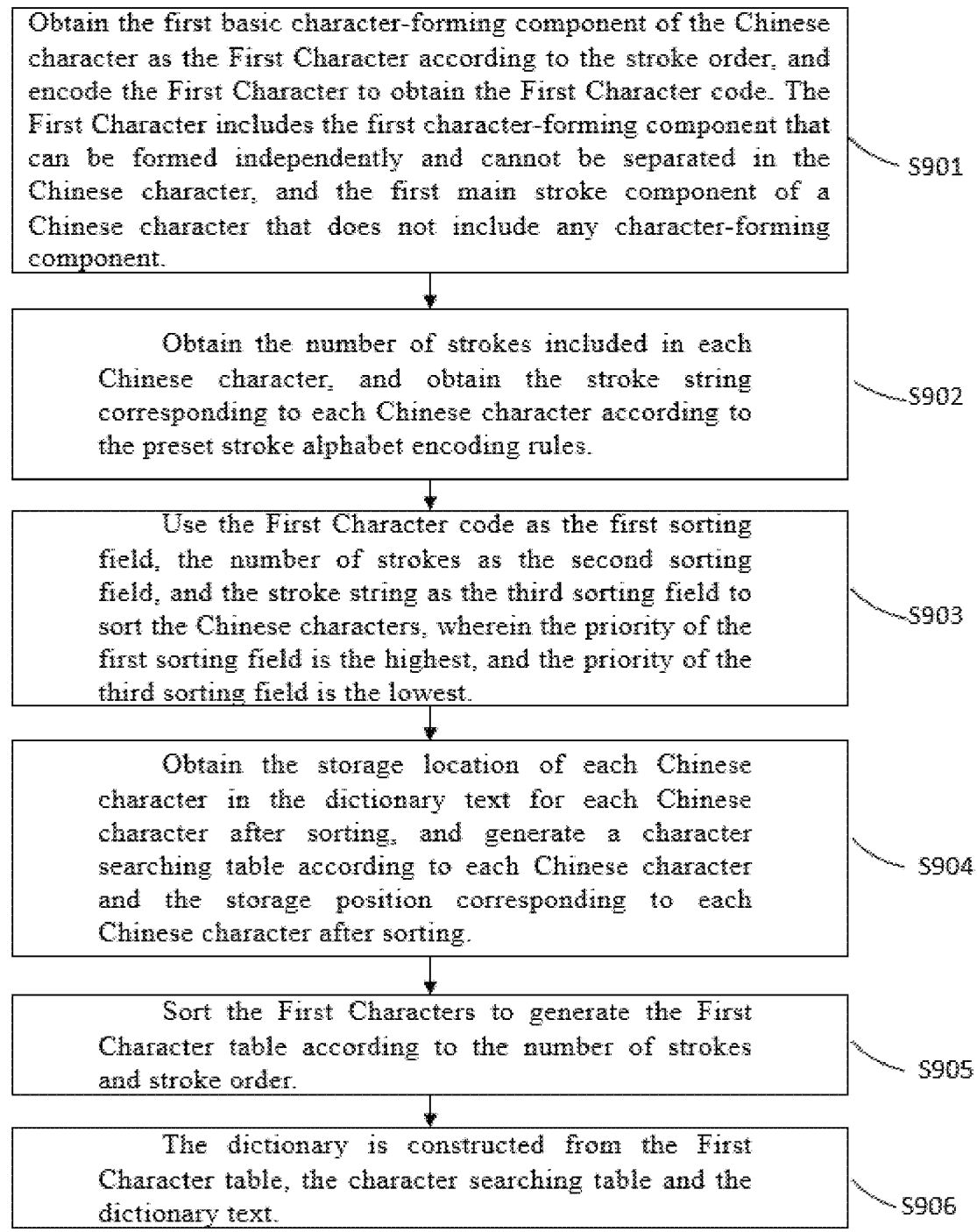
FIG. 9 is a schematic diagram of the main steps of the method for constructing a dictionary according to an embodiment of the present invention.

FIG. 9 is a schematic diagram of the main steps of the method for constructing a dictionary according to an embodiment of the present invention. As shown in FIG. 9, the method for constructing a dictionary in the embodiment of the present invention mainly includes the following steps S901 to step S906.

Step S901: Obtain the first basic character-forming component of a Chinese character as the First Character according to the stroke order, and encode the First Character to obtain the First Character code. The First Character includes the first character-forming component of the Chinese character that can be formed independently and cannot be separated, and the first main stroke component of a Chinese character that does not include any character-forming component;

Step S902: Obtain the number of strokes included in each Chinese character, and obtain the stroke string corresponding to each Chinese character according to the preset stroke alphabet encoding rules;

Step S903: Use the First Character code as the first sorting field, the number of strokes as the second sorting field, and the stroke string as the third sorting field to sort Chinese characters. Among them, the first sorting field has the highest priority and the third sorting field has the lowest priority;

Step S904: Obtain the storage location of each Chinese character in the dictionary text for each Chinese character after sorting, and generate a character searching table according to each Chinese character and the storage position corresponding to each Chinese character after sorting;

Step S905: According to the number of strokes and stroke order, sort the First Characters to generate the First Character table;

Step S906: The dictionary is constructed from the First Character table, the character searching table and the dictionary text.

In the above steps, step S901 to step S903 is the same as the implementation of step S101 to step S103, and will not be repeated here.

At step S904, the character searching table is used to check the specific storage position of a character in the dictionary text. It is divided into many groups according to the First Characters. Each group starts with a First Character, including all the characters containing the First Character, arranged in the order of strokes. The character searching table includes all the characters in the dictionary. The user checks the storage location of a character in the dictionary text through the First Character table and the character searching table. For an electronic dictionary, the storage location of a character in the dictionary body may be a certain page in a table of the database; for an entity dictionary, the storage location of a character in the dictionary body may be a certain page in the dictionary. FIG. 10 is a schematic diagram of the character searching table of an embodiment of the present invention, which shows one page of the character searching table of the present invention. According to the character searching table, the specific storage location of a character in the dictionary text can be queried.

At step S905, according to the number of strokes of the First Character and stroke order, the table for sorting the First Characters and used for searching the First Characters is called the First Character table in the present invention. This is the first form that users need to check when searching for a character, and it is the general form for searching for a character. It tells the user all the First Characters and the number of pages in the character searching table. From this table, the user finds the First Character of a character and the storage location of the First Character in the character searching table, and then searches for the specific character in the character searching table. For electronic dictionaries, the First Character points to the character searching table through the data location pointer. Therefore, the First Character table does not need to include the page of the First Characters in the character searching table; for the physical dictionary, the character searching table has a page number, and according to Number of strokes and stroke order, when sorting the First Characters to generate the First Character table, sort the First Characters according to the number of strokes from smallest to largest; then after the first sort, sort the First Characters with the same number of strokes in the order of the strokes for the second sorting; after that, sort them according to the second sorting. After that, the First Character and the page number of each First Character in the character searching table generates the First Character table. FIG. 11 is a schematic diagram of a First Character table of an embodiment of the present invention, in which, under each First Character in the First Character table, the page in the character searching table is marked, and the number in the box in front of the First Character indicates the stroke number of the First Character.

In addition, according to an embodiment of the present invention, in the specific process of generating the dictionary, before the First Character is encoded to obtain the First Character code, the obtained First Characters can also be adjusted according to the size of the dictionary and the characters included. Specifically, judge whether to adjust the First Characters obtained according to the size of the dictionary; if so, calculate the occurrence probability of each character component in the First Characters obtained;

afterwards, according to the set threshold, the character-forming components that the occurrence probability is less than the threshold and will not cause confusion are deleted from the acquired First Characters; or, can merge two components which contain a same component.

FIG. 12 is a schematic diagram of the First Character code of a sample dictionary according to an embodiment of the present invention. The sample dictionary of the present invention contains about four thousand characters, and its First Character code is shown in the FIG. 12. As shown, it contains only 171 First Characters. Under normal circumstances, if the number of characters in a dictionary is relatively small, then the number of the First Characters can also be less, the First Characters obtained can be adjusted. Specifically, firstly, the occurrence probability of each character component in the First Characters obtained should be counted. If the occurrence probability is less than a preset threshold, it indicates that the First Character constitutes few characters, the First Character can be considered not required or can be removed. And can also merge two components with one containing the other or two very similar components, for example, "犬" is merged into "大", "方" is merged into "刀", "户" is merged into "尸", "玉" is merged into "王", and "子" is merged into "孑", and so on. In addition, for some character-forming components with low occurrence probability, which are rarely used in this dictionary and are not easy to cause confusion after being removed, they can be deleted directly. However, for individual character-forming components, such as "四", although it is not used as the First Character in other characters of four thousand characters, it is still reserved in order to avoid confusion.

The following describes the dictionary construction method of the present invention in conjunction with a specific embodiment. In the embodiment of the present invention, the process of constructing a dictionary mainly includes the following steps:

1. Extract and analyze the First Characters of the characters in the dictionary to determine the First Characters included in the dictionary, and get the First Character code as shown in the FIG. 12. As shown, the number of strokes corresponding to each First Character, the number of stroke strings and the number of pages in the dictionary text;

2. Insert the First Characters into the auxiliary sorting table of the character searching table as shown in FIG. 5;

3. Insert each character in the dictionary into the table in FIG. 5 according to the following steps:

Step 1: in the FIG. 12, find the First Character contained in the character and the corresponding First Character code of the First Character in the First Character code table. Note that the character-forming components cannot be split. For example, if the first basic character-forming component contained is "白", you must select "白" instead of "日";

Step 2: Calculate the number of strokes contained in the character;

Step 3: Write the strokes of the character and follow the FIG. 5. Convert all strokes into a string of strokes;

Step 4: Find out the page index of the character in the text of the dictionary;

Step 5: Compare the character with the character in FIG. 5 according to its First Character code, number of strokes, and the sequence of stroke strings, and then insert the character into the corresponding line in order;

4. After inserting all the characters in the dictionary into the auxiliary sorting table of the character searching table shown in FIG. 5 according to the above steps, the characters in the first two columns of the table and the page index of the dictionary text are the content required by the character searching table. Take them out, put them together, and write the page index for the content, and the character searching table is made. For the convenience of reading, there is a blank line before each First Character in the table;

5. After making the character searching table, fill in the page index of the First Character in the character searching table back to the FIG. 12 below the First Character and remove the letter code, the First Character table as shown in FIG. 11 is made. The number below each First Character in the table indicates the page index of the First Character in the character searching table;

6. The dictionary can be constructed according to the First Character table, the search character table and the dictionary text.

Among them, in the above-mentioned embodiment, if the First Character contained in a character is "囗" and there is another First Character after it that is not "囗", then "囗" is not selected, but the first one after it that is not "囗" is selected, so that the characters are evenly distributed among the First Characters, and the searching efficiency is improved. For example, for the character "乑", choose "下" as the First Character instead of "囗".

In addition, if a character does not include any character-forming component, a main stroke First Character is selected as the First Character according to the first stroke of the character. According to the "GB13000.1 Character Set Chinese Character Folding Pen Specification", the stroke "提" is merged into the First Character " — ", the stroke "竖钩" is merged into the First Character "丨", the stroke "捺" is merged into the First Character "丶", and all the strokes of "折" are merged into the First Character "乙".

Since most of the character-forming components themselves are the simplest and most commonly used single-body characters, derived from the original pictographs, they have the strongest character-making function, and they represent a large part of the meaning of a combined character, and when they are in a combined character, the representative voice of the components are also very heavy. The character groups gathered with them as the core have distinct group characteristics of Chinese characters, and the difference in the number of characters in each group is not as obvious as the radical method, and the distribution is relatively balanced, which is conducive to rapid character searching.

According to another aspect of the present invention, a Chinese character searching method is provided.

Figure 13:
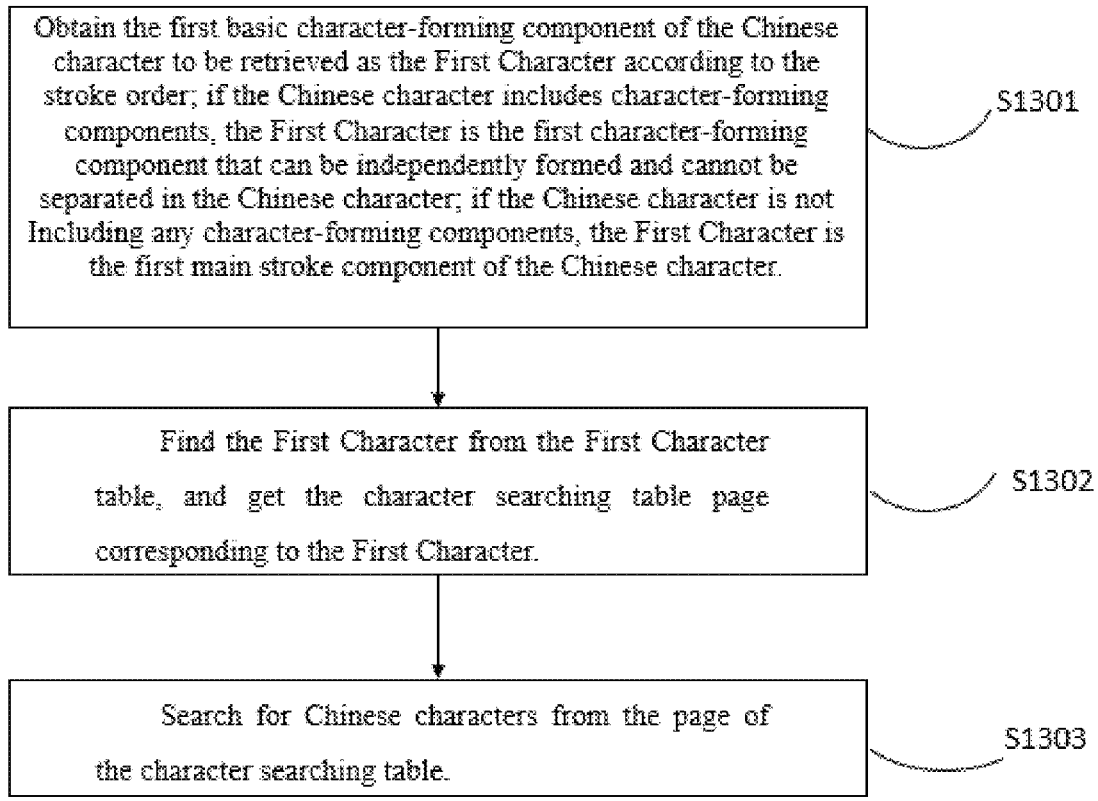
FIG. 13 is a schematic diagram of the main steps of the Chinese character searching method according to the embodiment of the present invention.

FIG. 13 is a schematic diagram of the main steps of the Chinese character searching method according to the embodiment of the present invention. As shown in FIG. 13, the Chinese character searching method of the embodiment of the present invention is a method for Chinese character searching using the dictionary constructed above, and mainly includes the following steps S1301 to step S1303.

Step S1301: Obtain the first basic character-forming component of the Chinese character to be retrieved as the First Character according to the stroke order; if the Chinese character includes character-forming components, the First Character is the first character-forming component that can be independently formed and cannot be separated in the Chinese character; if the Chinese character does not include any character-forming components, the First Character is the first main stroke component of the Chinese character;

Step S1302: Find the First Character from the First Character table, and get the character searching table page corresponding to the First Character;

Step S1303: Search for Chinese characters from the page of the character searching table.

Figure 14:
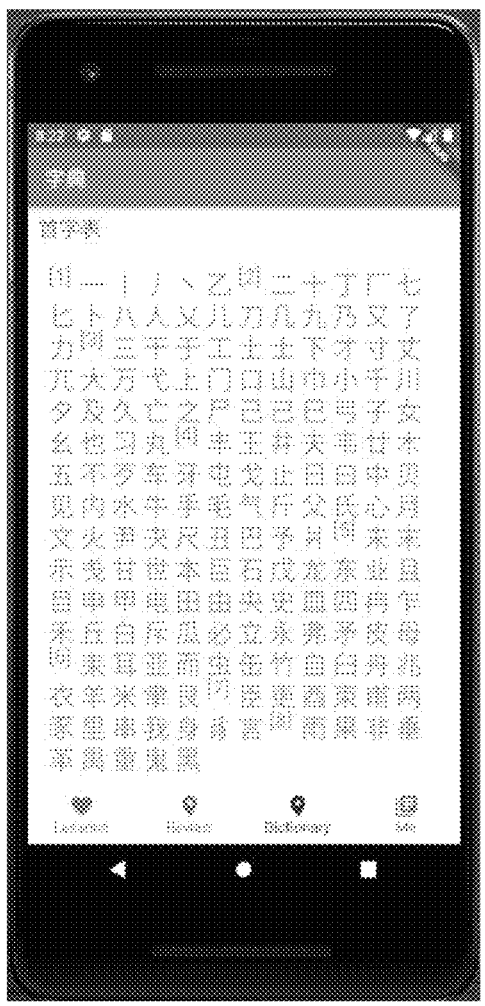
FIG. 14 is a schematic diagram of the First Character table of an electronic dictionary according to an embodiment of the present invention.
Figure 15:
FIG. 15 is a schematic diagram of an electronic dictionary searching table according to an embodiment of the present invention.
Figure 16:
FIG. 16 is a schematic diagram of the content of the Chinese character text of an electronic dictionary according to an embodiment of the present invention.

Below in conjunction with the attached FIGS. 14-16 introduces how to search for the character "班" in the electronic dictionary using the First Character method. FIG. 14 is a schematic diagram of the First Character table of an electronic dictionary according to an embodiment of the present invention; FIG. 15 is a schematic diagram of an electronic dictionary searching table according to an embodiment of the present invention; FIG. 16 is a schematic diagram of the content of Chinese characters in an electronic dictionary according to an embodiment of the present invention. First of all, in the FIG. 14, select the First Character "王" of the character "班" in the First Character table, then you can get the FIG. 15 as shown in the "王" checklist; then, in the FIG. 15, select the character "班" in the character searching list to get the FIG. 16 with a detailed explanation of the character "班". The whole process is very simple and fast.

In another embodiment of the present invention, if the dictionary is an entity dictionary, the First Character is searched from the First Character table, and the steps of obtaining the character searching table page corresponding to the First Character may specifically be: look up the First Character from the First Character table, and get the page number of the First Character in the character searching table; get the character searching table page corresponding to the First Character according to the page number. Specifically, in a dictionary sorted by the First Character table and the character searching table, the corresponding character searching method is as follows:

1. When looking up a character, first follow the stroke order and find the First Character contained in the character and the page index in the character searching table in the First Character table;

2. According to the page index of the First Character found in the character searching table, find the position of the First Character in the corresponding page in the character searching table;

3. Immediately behind the position of the First Character above, search for the character according to the number of strokes and stroke order of the Chinese character you are looking for.

Since the number of characters contained in the general First Character is not too large, the process of this character searching is clear at a glance. In a few cases, the number of strokes and the order of strokes are needed. If it cannot be found, then the dictionary does not include the character and is by no means ambiguous.

In the specific implementation process, if the First Character of a character is "囗", and there is another First Character that is not "囗" after it, find out the First Character that is not "囗" as the First Character and the page index in the character searching table for character search. If a character does not include any character-forming components, according to the first stroke of the character, find out the corresponding stroke First Character and its page index in the character searching table in order to search this character.

Below are some examples of Chinese character searching using FIG. 11 of the First Character table and FIG. 10 of the character searching table:

Check the character "杠", according to the stroke order, "木" is the First Character contained in the character, and then in the First Character table (FIG. 11) to find "木" and its page index 10 in the character searching table. Then in the character searching table (FIG. 10) to find page 10 and the First Character "木" on that page. The "杠" is just below it, and the number shows that its page index in the dictionary text is page 55. To the text 55$^{th}$ page, you can find the detailed information of the character on the page.

Check the character "汗". The first Basic Component of the character is "三点水", which is a non-characterized component, you need to skip it and select the First Character "干". Then find "干" in the First Character table and its page index 5 in the character searching table, and then find the position of page 5 and "干" in the character searching table. "汗" is just below it, and the number shows that its page index in the dictionary text is page 56.

To search for the character "叮", you need to skip "口" to search for the First Character "丁". According to the First Character list, "丁" is found on page 2 of the character searching table, and then on page 2 of the character searching table found the First Character "丁" and character "叮".

Check the character "勹", because the character does not contain any character-forming components, so check the First Character "丿" of the first stroke of the character in the First Character table. According to the First Character list, "丿" is on page 1 of the character searching table, and then on the first page of the character searching table, the First Character "丿" and character "勹" are found.

According to one of the embodiments of the present invention, the detailed content of the dictionary of a character can also be directly placed in the corresponding position of the character in the character searching table, so that there is no need to use numbers to point to the page where the dictionary text is located. After completing the auxiliary sorting of the character searching list, keep the order of the characters unchanged, but remove the content of each line of the character and replace it with the entire content of the character that you want to write in the dictionary. Then rename the character searching table to the main text of the dictionary. The original First Character table points to the page index of the search table, which is the position of the First Character in the dictionary text, in one step.

In addition, since traditional characters and Japanese and Korean Chinese characters use the same character-forming components as simplified characters, the present invention is also applicable to traditional characters and Japanese and Korean Chinese characters without any modification.

Figure 17:
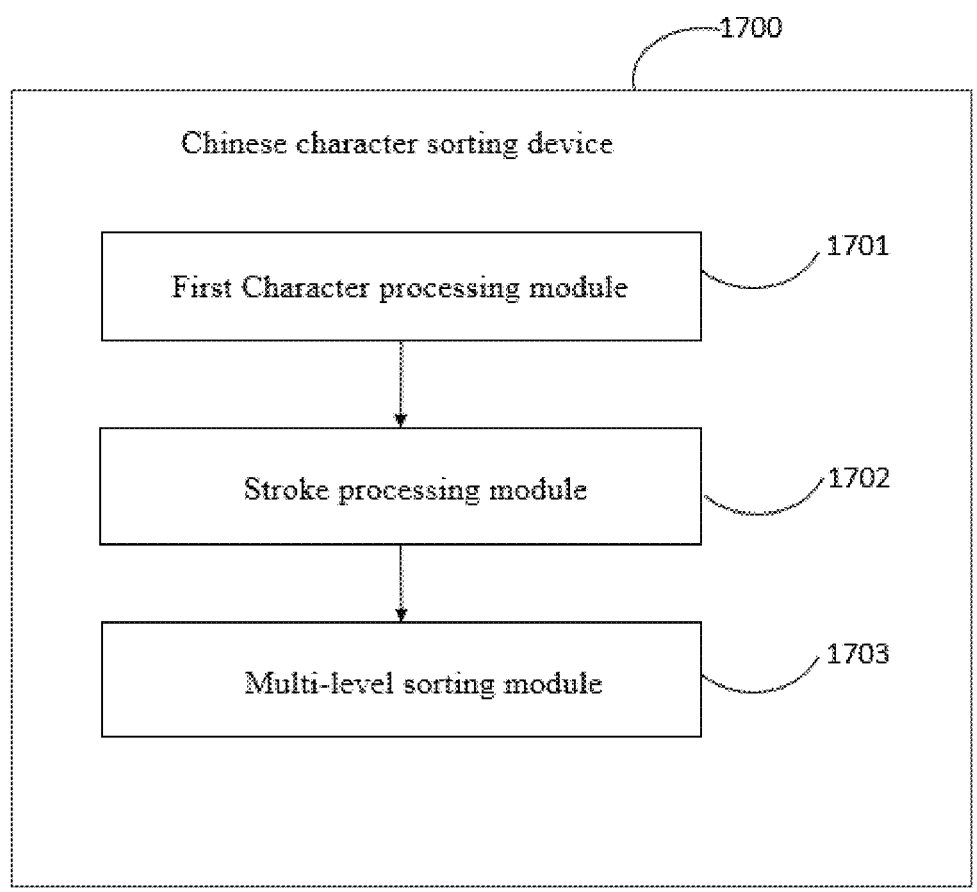
FIG. 17 is a schematic diagram of main modules of a Chinese character sorting device according to an embodiment of the present invention.

According to another aspect of the present invention, a Chinese character sorting device is provided. FIG. 17 is a schematic diagram of main modules of a Chinese character sorting device according to an embodiment of the present invention. As shown in FIG. 17, the Chinese character sorting device 1700 of the embodiment of the present invention mainly includes the First Character processing module 1701, stroke processing module 1702, and multi-level sorting module 1703.

First Character processing module 1701 is used to obtain the first basic character-forming component of a Chinese character as the First Character according to the stroke order, and encode the First Character to obtain the First Character code, and the First Character includes the first character-forming component that can be formed independently and cannot be separated in the Chinese character, and the first main stroke component of a Chinese character that does not include any character-forming components;

Stroke processing module 1702 is used to obtain the number of strokes included in each Chinese character, and obtain the stroke string corresponding to each Chinese character according to the preset stroke alphabet encoding rule;

Multi-level sorting module 1703 is used to sort the Chinese characters with the First Character code as the first sorting field, the number of strokes as the second sorting field, and the stroke string as the third sorting field, where the priority of the first sorting field is the highest, and the priority of the third sorting field is the lowest.

According to an embodiment of the present invention, first Character processing module 1701 can also be used for encoding the Basic Components of Chinese characters to obtain the double-alphabet code of the Basic Components; split the Chinese characters into Basic Components, and obtain the double-alphabet code of the Chinese characters according to the double-alphabet codes of the Basic Components; obtain the first basic character-forming component of the Chinese character according to the stroke order as the First Character, establish the association relationship between the Basic Component and the First Character, and generate a first matching table of the Basic Component double-alphabet code and the First Character code; determine the First Character of a Chinese character according to the double-alphabet code of the Chinese character and the first matching table.

According to another embodiment of the present invention, the First Character processing module 1701 can also be used: According to the "GB13000.1 Character Set Chinese Character Components Specification for Information Processing" to obtain the Basic Components of Chinese characters; first sort the Basic Components according to the number of strokes of the Basic Components; after the first sort, the second sorting is performed on Basic Components with the same number of strokes among the Basic Components according to the strokes included in the Basic Components; the Basic Components after the second sorting are saved in the table to generate an ordered code table to obtain the double-alphabet codes of the Basic Components, wherein the horizontal rows and columns of the ordered code table are respectively different types of characters encode.

According to an embodiment of the invention, first Character processing module 1701 can also be used for: According to "GB13000.1 Character Set Chinese Character Components Specification for Information Processing" to obtain the Basic Components of Chinese characters; according to whether the Basic Components are character-forming components, the Basic Components are divided into character-forming components and non-character-forming components, and the first sorting is performed; according to the number of strokes of the Basic Components, respectively performing a second sorting on the character-forming components and the non-character-forming components; performing a third sorting on the character-forming components and the non-character components respectively with the same number of strokes after the second sorting, according to the order of the strokes included in the Basic Components; the third sorted Basic Components are saved in a table to generate an ordered code table to obtain a Basic Component double-alphabet code, wherein the horizontal rows and vertical columns of the ordered code table are respectively coded with different types of alphabets.

According to another embodiment of the present invention, the First Character processing module 1701 can also be used for: according to "GB13000.1 Character Set Chinese Character Components Specification for Information Processing" splits Chinese characters into Basic Components; According to the double-alphabet code of the Basic Component, obtain the double-alphabet code of the Basic Component included in each Chinese character; for each Chinese character, according to "GB13000.1 Character Set Chinese Character Stroke Order Specification", according to the stroke order of the Basic Components included in the Chinese character, the double-alphabet codes of the Basic Components included in the Chinese character are combined to obtain the double-alphabet codes of the Chinese character.

According to another embodiment of the present invention, the First Character processing module 1701 can also be used to: obtain the Basic Component double-alphabet code included in the Chinese character double-alphabet code; according to the Basic Component double-alphabet code order, the double-alphabet code of each Basic Component is sequentially compared with the First Character code in the first matching table; for each double-alphabet code of the Basic Component, check the corresponding First Character in the first matching table. If the First Character is a character-forming First Character, the Basic Component double-alphabet code is taken as the First Character code of the Chinese character; otherwise, according to the first matching table, the first Basic Component double-alphabet code included in the Chinese character double-alphabet code is obtained, the corresponding First Character code is used as the First Character code of Chinese characters.

According to another embodiment of the present invention, if the first character-forming component of a Chinese character is "□", and the Chinese character also includes character-forming components that are not "□", the first character-forming component of the Chinese character that is not "□" is determined as the First Character of the Chinese character.

According to the invention's another embodiment, stroke processing module 1702 can also be used for: a corresponding letter is defined for each stroke as the alphabet code of the stroke; for the strokes included in each Chinese character, the alphabet codes corresponding to all the strokes are spliced according to the stroke order to obtain the stroke string corresponding to each Chinese character.

According to another embodiment of the present invention, the stroke processing module 1702 can also be used to: define a corresponding letter for each stroke as the alphabet code of the stroke; for the strokes included in each Basic Component, join the alphabet codes corresponding to all the strokes according to the stroke order to obtain the stroke string corresponding to each Basic Component; establish the association relationship between the Basic Component double-alphabet code and the Basic Component stroke string and generate a second matching table; for each Chinese character, obtain the Basic Component double-alphabet codes included in the Chinese character double-alphabet code of the Chinese character; for each Basic Component double-alphabet code, find the corresponding Basic Component stroke string from the second matching table; according to the order of the Basic Component double-alphabet code in the Chinese character double-alphabet code, the Basic Component stroke string corresponding to the code is spliced to obtain the stroke string corresponding to the Chinese character.

According to another embodiment of the present invention, the Chinese character double-alphabet code, the Basic Component double-alphabet code, and the First Character code are double-alphabet codes composed of upper and lower case letters; and, according to the First Character code, when sorting, the double-alphabet code character sequence is compared and sorted in sequence; when the stroke string is sorted, the stroke string is compared and sorted in sequence. According to the invention again, in one embodiment, the main stroke component includes " | ", " J " and " ヽ "; and, the Chinese character sorting device 1700 also includes the stroke merging module (not shown in the figure), which is used to merge the strokes "提" into the First Character "一", the strokes "竖钩" into the First Character " | ", the strokes "捺" into the First Character " ヽ ", and all the strokes of "折" into the First Character "乙", according to the "GB13000.1 Character Set Chinese Characters Folding Pen Specification".

Figure 18:
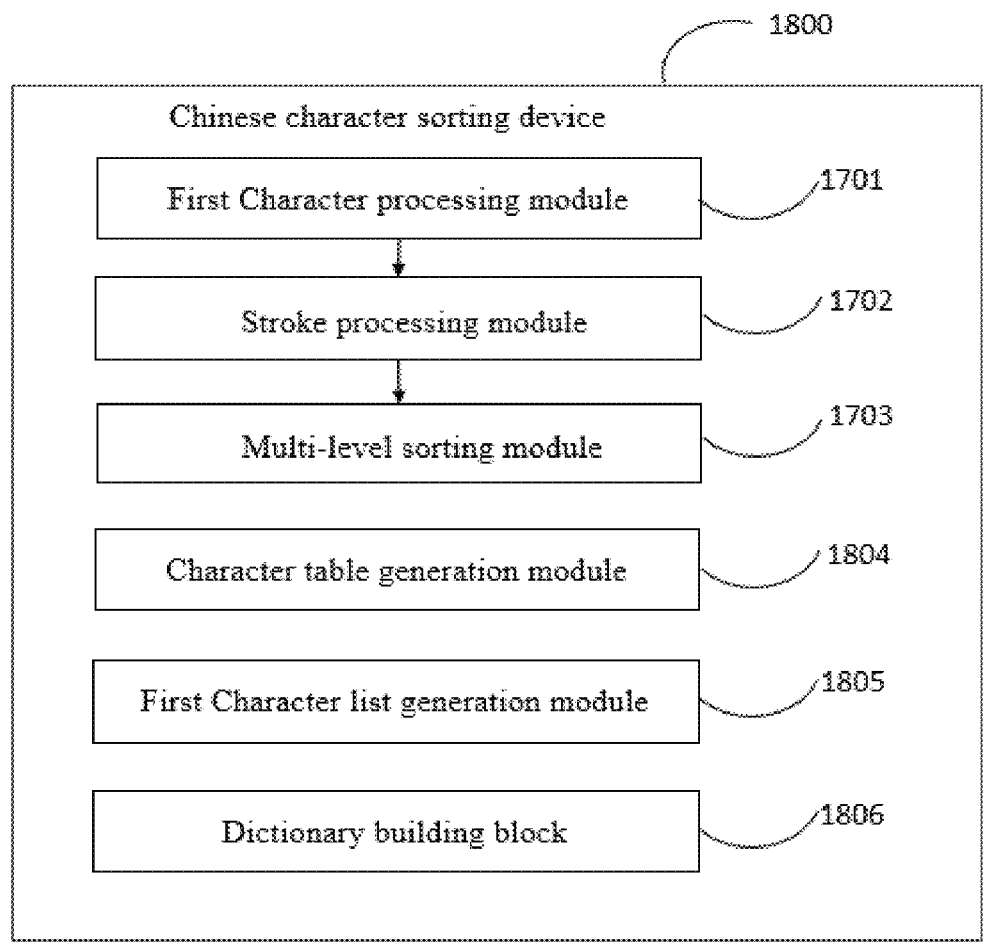
FIG. 18 is a schematic diagram of main modules of a device for constructing a dictionary according to an embodiment of the present invention.

According to another aspect of the present invention, an apparatus for constructing a dictionary is provided. FIG. 18 is a schematic diagram of the main modules of an apparatus for constructing a dictionary according to an embodiment of the present invention. As shown in FIG. 18, the device 1800 for constructing a dictionary according to an embodiment of the present invention mainly includes the First Character processing module 1701, stroke processing module 1702, multi-level sorting module 1703, generation module of character searching table 1804, the First Character table generation module 1805, and dictionary building blocks 1806. Among them, the First Character processing module 1701, stroke processing module 1702 and multi-level sorting module 1703 are the same as the modules included in the Chinese character sorting device 1700.

First Character processing module 1701. Obtain the first basic character-forming component of a Chinese character as the First Character according to the stroke order, and encode the First Character to obtain the First Character code. The First Character includes the first character-forming component that can be formed independently and cannot be separated in the Chinese character, and the first main stroke component of a Chinese character that does not include any character-forming components;

Stroke processing module 1702. Obtain the number of strokes included in each Chinese character, and obtain the stroke string corresponding to each Chinese character according to the preset stroke alphabet encoding rule;

Multi-level sorting module 1703. Use the First Character code as a first sorting field, the number of strokes as a second sorting field, and the stroke string as a third sorting field to sort the Chinese characters, wherein the first sorting field has the highest priority, and the third sorting field has the lowest priority;

Check character searching table generation module 1804. For each sorted Chinese character, obtain the storage position of each Chinese character in the dictionary text, and generate a character searching table according to each sorted Chinese character and the storage position corresponding to each Chinese character;

First Character table generation module 1805, used according to the number of strokes and the stroke order to sort the First Character to generate a First Character table;

Dictionary building block 1806, used to construct a dictionary from the First Character table, the search character table, and the dictionary text.

According to an embodiment of the present invention, the character searching table has a page index, and the First Character table generation module 1805 can also be used for: sort the First Characters according to the number of strokes in descending order; sort the First Characters after the first sorting, sort the First Characters with the same number of strokes in the order of the strokes for the second time; sort according to the second sorting the First Characters and the page index of each First Character in the character searching table to generate the First Character table.

According to another embodiment of the present invention, an apparatus for constructing a dictionary 1800 also includes a First Character adjustment module (not shown in the figure), which is used to adjust the obtained First Characters according to the size of the dictionary and the characters included before encoding the First Characters to obtain the First Character code.

According to another embodiment of the present invention, the First Character adjustment module (not shown in the figure) can also be used to determine whether to adjust the First Characters obtained according to the size of the dictionary; if so, count every character in the First Characters obtained. The occurrence probability of a character-forming component; according to the set threshold, the character-forming component whose appearance probability is less than the threshold and will not cause confusion after deletion is deleted from the First Characters obtained; or, can merge two components with one containing the another or two very similar components.

The specific implementation of the First Character adjustment module is completed by adjusting the matching in the component double-alphabet code/First Character code matching table. Just change the First Character corresponding to a component, the First Character adjustment module will re-run the entire Chinese character sorting device to get a new dictionary sorting result, and give the statistical result for reference. Since moving a First Character may affect many Chinese characters, the calculation is very intensive. If there is no First Character adjust module, such adjustment is impossible to be scientifically accurate. Here are a few examples. E.g: to merge "广" and "厂", just change the First Character corresponding to the Basic Component "广" to the same initial code corresponding to the Basic Component "厂"; to not use the character "文" as the First Character of a character-forming component, just change the First Character code corresponding to the component to the corresponding main stroke First Character " ヽ " of the component's first stroke " ヽ ". That's it. In short, it's very convenient and efficient.

Figure 19:
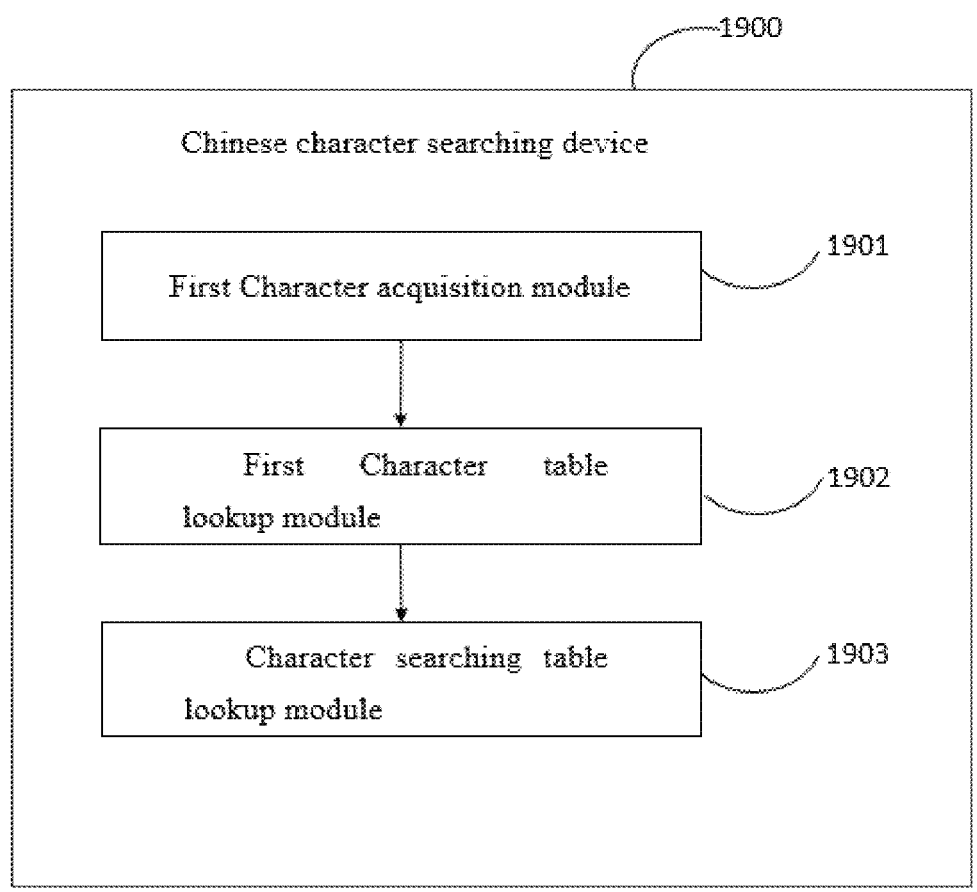
FIG. 19 is a schematic diagram of main modules of a Chinese character searching device according to an embodiment of the present invention.

According to another aspect of the present invention, a Chinese character searching device is provided. FIG. 19 is a schematic diagram of the main modules of the Chinese character searching device according to an embodiment of the present invention. As shown in FIG. 19, the Chinese character searching device of the embodiment of the present invention 1900 mainly includes the First Character acquisition module 1901, First Character table lookup module 1902, and character searching table lookup module 1903.

First Character acquisition module 1901, used to obtain the first basic character-forming component of the Chinese character to be retrieved as the First Character according to the stroke order; if the Chinese character includes character-forming components, the First Character is the First character-forming component; if the Chinese character does not include any character-forming component, the First Character is the first main stroke component of the Chinese character;

First Character table lookup module 1902, used to find the First Character from the First Character table, and obtain the character searching table page corresponding to the First Character;

Character searching table lookup module 1903, used to search for the Chinese character from the page of the character searching table.

According to an embodiment of the present invention, the First Character table lookup module 1902 can also be used to: find the First Character from the First Character table, and obtain the page index of the First Character in the character searching table; obtain the character searching table page corresponding to the First Character according to the page index.

According to the technical solution of the embodiment of the present invention, the first basic character-forming component of a Chinese character is obtained according to the stroke order as the First Character, and the First Character is encoded to obtain the First Character code. The First Character includes the first character-forming component which can be independently formed and cannot be separated and the first main stroke component of a Chinese character that does not include any character-forming components; obtain the number of strokes included in each Chinese character, and obtain the corresponding stroke string of each Chinese character according to the preset stroke alphabet encoding rules; the First Character code is used as the first sorting field, the number of strokes is used as the second sorting field, and the stroke string is used as the third sorting field to sort Chinese characters. Among them, the first sorting field has the highest priority and the third sorting field has the lowest priority. The technical solution can use the first basic character-forming component (First Character) as the standard for Chinese character sorting and searching, which solves the problem of the traditional radical checking method because the definition and position of radicals are not fixed, the lack of strictness, and the difficulty of sorting and searching caused by regularity, etc., breaks the tradition of using radicals that are not characters in themselves, and is systematic, rigorous, practical, efficient, easy to learn and easy to use.

Figure 20:
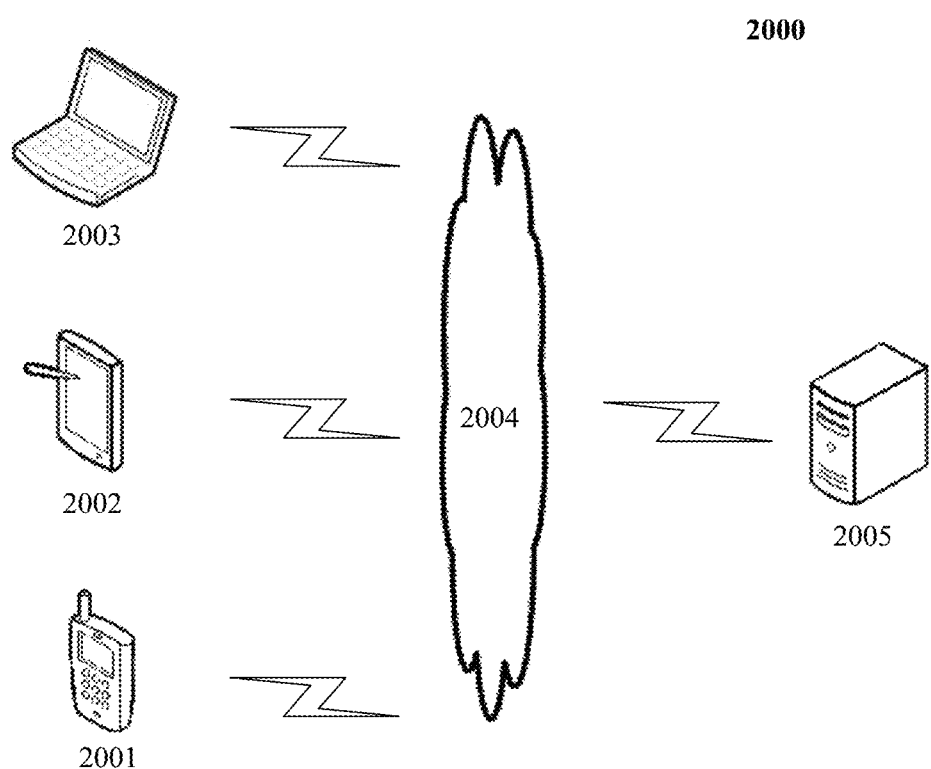
FIG. 20 is an exemplary system architecture diagram to which the embodiments of the present invention can be applied.

FIG. 20 shows an exemplary system architecture 2000 of a method for ranking Chinese characters, searching for Chinese characters and building a dictionary or a device for ranking Chinese characters, searching for Chinese characters and building a dictionary to which the embodiments of the present invention can be applied.

As shown in FIG. 20, the system architecture 2000 can include terminal equipment 2001, 2002, 2003, network 2004 and server 2005. The internet 2004 used in terminal equipment 2001, 2002, 2003 and server 2005 provides the medium of communication link. The internet 2004 can include various connection types, such as wired, wireless communication links, or fiber optic cables, and so on.

Users can use terminal equipment 2001, 2002, 2003 through the network 2004 with the server 2005 interaction to receive or send messages, etc. On terminal Equipment 2001, 2002, 2003, various communication client applications can be installed, such as electronic dictionary applications, web browser applications, search applications, input method applications, virtual keyboard applications, etc. (only examples).

Terminal Equipment 2001, 2002, 2003 can be various electronic devices that have a display screen and support web browsing, including but not limited to smart phones, tablet computers, laptop portable computers, desktop computers, and so on.

Server 2005 can be a server that provides various services, such as the back-end management server that provides support for the Chinese character sorting request (just an example) using terminal equipment 2001, 2002, 2003 for users. The background management server can analyze and process the received Chinese character sorting request and other data, and can feed back the processing result (such as the Chinese character sorting result, just an example) to the terminal device.

It should be noted that the methods for sorting Chinese characters, searching for Chinese characters, and constructing dictionaries provided by the embodiments of the present invention can be performed by the server 2005 Execution and execution of terminal 2001, 2002, and 2003. Correspondingly, the devices for sorting Chinese characters, searching for Chinese characters and building a dictionary can be set on the server 2005 or terminal 2001, 2002, and 2003.

It should be understood that in the FIG. 20, the number of terminal devices, networks, and servers is only illustrative. According to implementation needs, there can be any number of terminal devices, networks, and servers.

Figure 21:
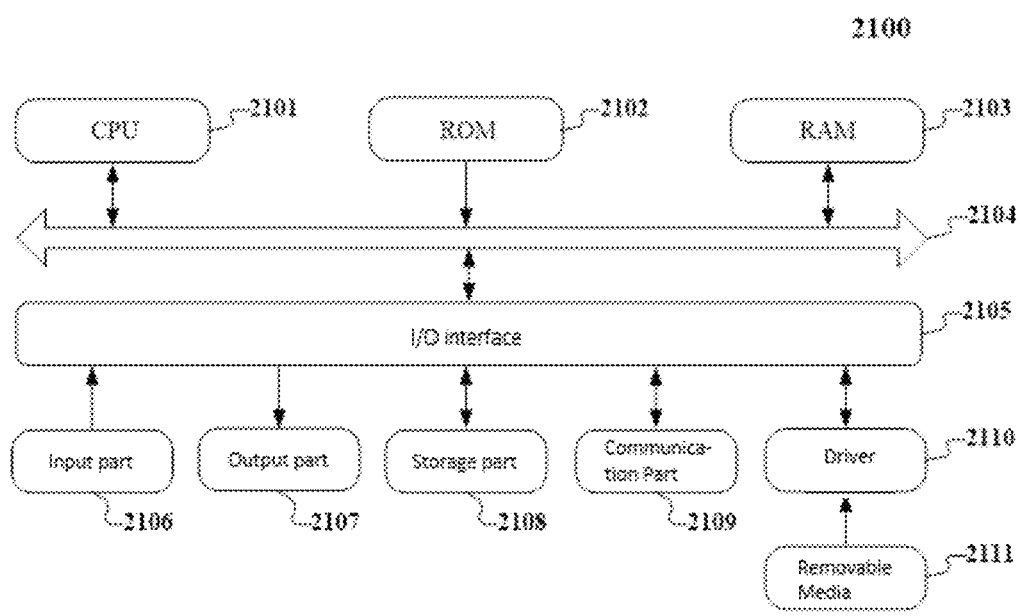
FIG. 21 is a schematic structural diagram of a computer system suitable for implementing the terminal device or server of the embodiment of the present invention.

Refer to the FIG. 21, which shows the schematic diagram of structure of a computer system suitable for implementing the terminal device or server of the embodiment of the present invention 2100. The terminal device or server as shown in FIG. 21 is only an example, and should not bring any limitation to the function and scope of use of the embodiments of the present invention.

As shown in FIG. 21, the computer system 2100 includes central processing unit (CPU) 2101, which can execute various appropriate actions and processing according to programs stored in read-only memory (ROM) 2102 or programs from random access memory (RAM) 2103 loaded from the storage part 2108. In RAM 2103, there is also various programs and data required for operation by system 2100. CPU 2101, ROM 2102 and RAM 2103 via the bus 2104 are connected to each other. Input/output (I/O) interface 2105 also connected to the bus 2104.

The following components are connected to the I/O interface 2105: Input part 2106 including keyboard, mouse, etc.; output parts 2107 including such as cathode ray tube (CRT), liquid crystal display (LCD), etc., and speakers; storage part 2108 including the hard disk, etc.; and the communication part 2109 including network interface cards such as LAN cards, modems, etc. Communication part 2109 performs communication processing via a network such as the Internet. Driver 2110 also connects to the I/O interface 2105 as needed. Removable media 2111, such as magnetic disks, optical disks, magneto-optical disks, semiconductor memory, etc., is installed in the drive 2110 as needed, so that the computer program read from it is installed into the storage part 2108 as needed .

In particular, according to the disclosed embodiments of the present invention, the process described above with reference to the flowchart can be implemented as a computer software program. For example, the disclosed embodiments of the present invention include a computer program product, which includes a computer program carried on a computer-readable medium, and the computer program contains program code for executing the method shown in the flowchart. In such an embodiment, the computer program 2109 can be downloaded and installed from the Internet, and/or installed from removable media 2111. In this computer program is the central processing unit (CPU) 2101, when is executed, it executes the above-mentioned functions defined in the system of the present invention.

It should be noted that the computer-readable medium shown in the present invention may be a computer-readable signal medium or a computer-readable storage medium, or any combination of the two. The computer-readable storage medium may be, for example, but not limited to, an electrical, magnetic, optical, electromagnetic, infrared, or semi-conductor system, device, or device, or any combination of the above. More specific examples of computer-readable storage media may include, but are not limited to: electrical connections with one or more wires, portable computer disks, hard disks, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the above. In the present invention, the computer-readable storage medium may be any tangible medium that contains or stores a program, and the program may be used by or in combination with an instruction execution system, apparatus, or device. In the present invention, a computer-readable signal medium may include a data signal propagated in a baseband or as a part of a carrier wave, and a computer-readable program code is carried therein. This propagated data signal can take many forms, including but not limited to electromagnetic signals, optical signals, or any suitable combination of the foregoing. The computer-readable signal medium may also be any computer-readable medium other than the computer-readable storage medium. The computer-readable medium may send, propagate, or transmit the program for use by or in combination with the instruction execution system, apparatus, or device. The program code contained on the computer-readable medium can be transmitted by any suitable medium, including but not limited to: wireless, wire, optical cable, RF, etc., or any suitable combination of the above.

The flowcharts and block diagrams in the accompanying drawings illustrate the possible implementation architecture, functions, and operations of the system, method, and computer program product according to various embodiments of the present invention. In this regard, each block in the flowchart or block diagram can represent a module, program segment, or part of code, and the above-mentioned module, program segment, or part of code contains one or more executable instructions for realizing the specified logic function. It should also be noted that, in some alternative implementations, the functions marked in the block may also occur in a different order from the order marked in the drawings. For example, two blocks shown in succession can actually be executed substantially in parallel, and they can sometimes be executed in the reverse order, depending on the functions involved. It should also be noted that each block in the block diagram or flowchart, and the combination of blocks in the block diagram or flowchart, can be implemented by a dedicated hardware-based system that performs the specified functions or operations, or can be realized by a combination of dedicated hardware and computer instructions.

The units or modules involved in the embodiments described in the present invention can be implemented in software or hardware. The described unit or module can also be provided in the processor, for example, it can be described as: a processor includes a First Character processing module, a stroke processing module, and a multi-level sorting module. Among them, the names of these units or modules do not constitute a limitation on the unit or module itself under certain circumstances. For example, the First Character processing module can also be described as "used to obtain the first basic character-forming component of Chinese characters according to the stroke order. As the First Character, and encode the First Character to obtain the First Character code".

As another aspect, the present invention also provides a computer-readable medium. The computer-readable medium may be included in the device described in the above embodiment; or it may exist alone without being assembled into the device. The above-mentioned computer-readable medium carries one or more programs. When the above-mentioned one or more programs are executed by a device, the device includes: acquiring the first basic character-forming component of a Chinese character as the First Character according to the stroke order, and comparing all the encoding of the First Character to obtain the First Character code, where the First Character includes the first character-forming component of the Chinese character that can be formed independently and cannot be separated, and the first main stroke component of the Chinese character that does not include any character-forming components; obtain the number of strokes included in each Chinese character, and obtain the stroke string corresponding to each Chinese character according to the preset stroke alphabet encoding rule; use the First Character code as the first sorting field, and the number of strokes as the second sorting field, the stroke string is used as a third sorting field to sort the Chinese characters, wherein the priority of the first sorting field is the highest, and the priority of the third sorting field is the lowest.

According to the technical solution of the embodiment of the present invention, the first basic character-forming component of a Chinese character is obtained according to the stroke order as the First Character, and the First Character is encoded to obtain the First Character code. The First Character includes the first character-forming component which can be independently formed and cannot be separated, and the first main stroke component of a Chinese character that does not include any character-forming components; obtain the number of strokes included in each Chinese character, and obtain the corresponding stroke string of each Chinese character according to the preset stroke alphabet encoding rules; the First Character code is used as the first sorting field, the number of strokes is used as the second sorting field, and the stroke string is used as the third sorting field to sort Chinese characters. Among them, the first sorting field has the highest priority and the third sorting field has the lowest priority. The technical solution can use the first basic character-forming component (First Character) as the standard for Chinese character sorting and searching, which solves the problem of the traditional radical checking method because the definition and position of radicals are not fixed, and the lack of strictness, the difficulty of sorting and searching caused by regularity, etc., breaks the tradition of using radicals that are not characters in themselves, and is systematic, rigorous, practical, efficient, easy to learn and easy to use.

The foregoing specific implementations do not constitute a limitation on the protection scope of the present invention. Those skilled in the art should understand that, depending on design requirements and other factors, various modifications, combinations, sub-combinations, and substitutions can occur. Any modification, equivalent replacement and improvement made within the spirit and principle of the present invention should be included in the protection scope of the present invention.

The invention claimed is:
1. A method for sorting Chinese characters in Chinese dictionaries and Chinese books based on the first basic character-forming components as defined in standard "GB13000.1 Character Set Chinese Character Components Specification for Information Processing", which is characterized in that it includes:
Obtain the first basic character-forming component of a Chinese character as the First Character according to the stroke order, or obtain the first main stroke component of the Chinese character as the First Character if it doesn't contain any basic character-forming component, and encode the First Character to obtain the First Character code;
Obtain the number of strokes included in each Chinese character, and obtain the stroke string corresponding to each Chinese character according to the preset stroke alphabet encoding rule;
Use the First Character code as the first sorting field, the number of strokes as the second sorting field, and the stroke string as the third sorting field to sort the Chinese characters, wherein the priority of the first sorting field is the highest, and the priority of the third sorting field is the lowest.

2. The Chinese character sorting method according to claim 1, wherein obtaining the first basic character-forming component of a Chinese character according to the stroke order as the First Character, and encoding the First Character to obtain the First Character code comprises:
Encode the Basic Components of the Chinese character to obtain the double-alphabet code of the Basic Components;
Split the Chinese character into Basic Components, and obtain the double-alphabet code of the Chinese character according to the double-alphabet code of the Basic Components;
Obtain the first basic character-forming component of a Chinese character as the First Character according to the stroke order, establish an association relationship between the Basic Component and the First Character, and generate a first matching table of the Basic Component double-alphabet code and the First Character code;
The First Character code of the Chinese character is determined according to the double-alphabet code of the Chinese character and the first matching table.

3. The Chinese character sorting method according to claim 2, wherein the Basic Components of a Chinese character are encoded to obtain the double-alphabet code of the Basic Components comprises:
Obtain the Basic Components of the Chinese character according to the "GB13000.1 Character Set Chinese Character Components Specification for Information Processing";
Perform a first sorting on the Basic Components according to the number of strokes of the Basic Components;
For the Basic Components with the same number of strokes among the Basic Components after the first sorting, perform the second sorting according to the order of the strokes included in the Basic Components;
The second sorted Basic Components are saved in a table to generate an ordered code table to obtain the Basic Component double-alphabet code, wherein the horizontal row and the vertical column of the ordered code table are respectively coded with different types of alphabets.

4. The Chinese character sorting method according to claim 2, wherein the Basic Components of a Chinese character are encoded to obtain the double-alphabet code of the Basic Components comprises:
Obtain the Basic Components of the Chinese character according to the "GB13000.1 Character Set Chinese Character Components Specification for Information Processing";
Divide the Basic Components into character-forming components and non-character-forming components according to whether the Basic Components are character-forming components, and perform the first sorting;
According to the number of strokes of the Basic Components, respectively perform a second sorting on the character-forming components and the non-character-forming components;
For the Basic Components with the same number of strokes in the character-forming components and non-character-forming components after the second sorting, perform a third sorting respectively according to the stroke order included in the Basic Components;
The third sorted Basic Components are saved in a table to generate an ordered code table to obtain a Basic Component double-alphabet code, wherein the horizontal rows and vertical columns of the ordered code table are respectively coded with different types of alphabets.

5. The Chinese character sorting method according to claim 2, wherein splitting of a Chinese character into Basic Components and obtaining the Chinese character double-alphabet codes according to the Basic Component double-alphabet codes comprises:
According to the "GB13000.1 Character Set Chinese Character components Specification for Information Processing", Chinese characters are split into Basic Components;
According to the double-alphabet code of the Basic Components, obtain the double-alphabet code of the Basic Components included in each Chinese character;
For each Chinese character, according to "GB13000.1 Character Set Chinese Character Stroke Order Specification", according to the stroke order of the Basic Components included in the Chinese character, the double-alphabet codes of the Basic Components included in the Chinese character are combined to obtain the Chinese character double-alphabet code.

6. The Chinese character sorting method according to claim 2, wherein the First Character code includes the character-forming First Character code and the main stroke First Character code;
Determining the First Character code of the Chinese character according to the Chinese character double-alphabet code and the first matching table comprises:
Acquiring the double-alphabet code of the Basic Components included in the double-alphabet code of the Chinese character;
According to the order of the double-alphabet codes of the Basic Components, check the First Character code in the first matching table corresponding to the double-alphabet code of each Basic Component in turn;
For each Basic Component double-alphabet code, if a certain First Character code in the first matching table corresponding to the double-alphabet code of the Basic Component is a character-forming First Character code, then the First Character code is taken as the First Character code of the Chinese character; Otherwise, according to the first match table, obtain the First Character code corresponding to the first Basic Component double-alphabet code as the First Character of the Chinese character.

7. According to the claim 1, the Chinese character ranking method described in any one of the above is characterized in that if the first character-forming component of a Chinese character is "q", and the Chinese character also includes non-"q" character-forming components, the first non-"2" character-forming component is determined as the First Character of the Chinese character.

8. According to claim 1, the Chinese character sorting method is characterized by acquiring the stroke string corresponding to each Chinese character according to a preset stroke alphabet encoding rule includes: Define a corresponding alphabet for each stroke as the alphabet code of the stroke; For the strokes included in each Chinese character, the stroke alphabets corresponding to all the strokes are spliced according to the stroke order to obtain the stroke string corresponding to each Chinese character.

9. According to claim 1, the Chinese character sorting method is characterized by obtaining the stroke string corresponding to each Chinese character according to the preset stroke alphabet encoding rules includes:
Define a corresponding alphabet for each stroke as the alphabet code of the stroke; For strokes included in each Basic Component, splice the alphabet codes corresponding to all strokes according to the stroke order to get stroke string corresponding to each Basic Component;
Establish the double-alphabet code of the Basic Component and the Basic Component stroke string association relationship and generate second matching table;
For each Chinese character, get the double-alphabet codes of the Basic Components included in the Chinese character according to the Chinese character double-alphabet code; For each Basic Component double-alphabet code, from the second matching table, find the corresponding Basic Component's stroke string;
According to the order of Basic Component double-alphabet code in the Chinese character's double-alphabet code, splice the stroke string of each Basic Component to form the stroke string for the character.

10. The Chinese character sorting method according to claim 2, wherein the Chinese character double-alphabet code, the Basic Component double-alphabet code, and the First Character code are double-alphabet codes composed of uppercase and lowercase letters; and,
according to when the First Character code is sorted, the double-alphabet code is compared and sorted in sequence; when the stroke string is sorted, it is compared and sorted in sequence.

11. The Chinese character sorting method according to claim 1, wherein the main stroke components include "-", "│", ")", "" and "Z"; and the method further comprises: "提" is "竖捺" According to the "GB13000.1 Character Set Chinese Characters Folding Pen Specification", the stroke merged into the First Character "- ", the stroke WJ" is merged into the First Character ""│"", and the stroke " is merged into the First Character """, consolidate all the strokes of into the First.

12. According to claim 1, a device for sorting Chinese characters based on the first basic character-forming component, includes:
The First Character processing module is used to obtain the first basic character-forming component of a Chinese character or the first main stroke component of the Chinese character if it does not contain any basic character-forming component according to the stroke order as the First Character, and encode the First Character to obtain the First Character code;
The stroke processing module is used to obtain the number of strokes included in each Chinese character, and obtain the stroke string corresponding to each Chinese character according to the preset stroke alphabet encoding rule;
A multi-level sorting module for sorting the Chinese characters using the First Character code as the first sorting field, the number of strokes as the second sorting field, and the stroke string as the third sorting field wherein the priority of the first sorting field is the highest, and the priority of the third sorting field is the lowest.

13. According to claim 1, the method for constructing a dictionary based on the Chinese character sorting method of the first basic character-forming component described in any one of the above is characterized in that it includes:
Obtain the first basic character-forming component of the Chinese character or the first main stroke component of the Chinese character if it does not contain any basic character-forming component according to the stroke order as the First Character, and encode the First Character to obtain the First Character code;
Obtain the number of strokes included in each Chinese character, and obtain the stroke string corresponding to each Chinese character according to the preset stroke alphabet encoding rule; The First Character code is used as the first sorting field, the number of strokes is used as the second sorting field, and the stroke string is used as the third sorting field to sort the Chinese characters, wherein the priority of the first sorting field is the highest, and the priority of the third sorting field is the lowest;
For each sorted Chinese character, obtain the storage position of each Chinese character in the dictionary text, and generate a character searching table according to each sorted Chinese character and the storage position corresponding to each Chinese character; According to the number of strokes and stroke order, sort the First Characters to generate a First Character table; A dictionary is constructed from the First Character table, the search character list, and the dictionary text.

14. According to the claim 13, the method for constructing a dictionary is characterized in that the character searching table has a page number, and according to the number of strokes and the stroke order, sorting the First Characters to generate the First Character table includes:
According to the number of strokes from small to big, the First Characters do the first sort;
For the First Characters after the first sort, for First Characters with the same number of strokes, perform the second sort according to the stroke order;
According to the First Characters after the second sort and the page number of each First Character in the character searching table, generates the First Character table.

15. According to the claim 13, the method for constructing a dictionary is characterized in that, before encoding the First Character to obtain the First Character code, the method further includes:
According to the size of the dictionary and the included characters, the First Characters obtained are adjusted.

16. According to the claim 15, the method for constructing a dictionary is characterized in that, according to the size of the dictionary and the included characters, adjusting the First Characters obtained includes:
- Determine whether to adjust the First Characters obtained according to the size of the dictionary;
- If yes, calculate the occurrence probability of each character-forming component in the First Characters obtained;
- According to the set threshold, delete the character-forming components whose occurrence probability is less than the threshold and will not cause confusion after deletion from the acquired First Characters;
- Or, combining the character-forming components which contain a same character-forming component.

17. According to claim 12, the device for constructing a dictionary based on the Chinese character sorting method of the first basic character-forming component according to any one of the above is characterized in that it comprises:
- The First Character processing module obtains the first basic character-forming component of a Chinese character or the first main stroke of the Chinese character if it does not contain any basic character-forming component according to the stroke order as the First Character, and encodes the First Character to obtain the First Character code;
- The stroke processing module obtains the number of strokes included in each Chinese character, and obtains the stroke string corresponding to each Chinese character according to the preset stroke alphabet encoding rule; The multi-level sorting module uses the First Character code as the first sorting field, the number of strokes as the second sorting field, and the stroke string as the third sorting field to sort the Chinese characters, wherein The first sorting field has the highest priority, and the third sorting field has the lowest priority;
- The character searching table generation module is used to obtain the storage position of each Chinese character in the dictionary text for each Chinese character after sorting, and generate the searching table according to each Chinese character after sorting and the storage position corresponding to each Chinese character, The First Character table generation module, used to generate a First Character table according to the number of strokes and stroke order of the First Characters; The dictionary construction module is used to construct a dictionary from the First Character table, the character searching table and the dictionary text.

18. According to the claim 13, the method for searching Chinese characters in a dictionary constructed by the method described in any one of the methods is characterized in that it comprises:
- Obtain the first basic character-forming component of the Chinese character or the first main stroke component of the Chinese character if it doesn't contain any basic character-forming component according to the stroke order as the First Character;
- Find the First Character from the First Character table, and obtain the character searching table page corresponding to the First Character; Look up the Chinese character from the page of the character searching table.

19. According to the claim 18, the method for searching Chinese characters is characterized in that, finding the First Character from the First Character table and obtaining the character searching table page corresponding to the First Character includes:
- Find the First Character from the First Character table, and obtain the page number of the First Character in the character searching table;
- According to the page number, the page of the character searching table corresponding to the First Character is obtained.

20. One use as claimed in claim 13, the device for searching Chinese characters in a dictionary constructed by any one of the methods is characterized in that it comprises:
- The First Character acquisition module is used to obtain the first basic character-forming component of the Chinese character or the first main stroke component of the Chinese character if it does not contain any basic character-forming component according to the stroke order as the First Character;
- The First Character table search module, which is used to find the First Character from the First Character table, and obtain the character searching table page corresponding to the First Character;
- The character searching table searching module is used to search the Chinese characters from the page of the character searching table.

21. An electronic device, characterized in that it comprises: One or more processors; Storage device, used to store one or more programs; When the one or more programs are executed by the one or more processors, the one or more processors implement any of the methods described in the claim 12.

22. A non-transitory computer-readable medium with a computer program stored thereon, wherein the program is executed by a processor to achieve any of the above methods described in claim 1.

* * * * *